(12) United States Patent
Kim et al.

(10) Patent No.: US 8,743,827 B2
(45) Date of Patent: Jun. 3, 2014

(54) SWITCHING METHOD AND APPARATUS IN BROADBAND WIRELESS COMMUNICATION SYSTEM

(75) Inventors: Kyung-Kyu Kim, Seoul (KR); Jae-Jeong Shim, Seongnam-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 12/939,440

(22) Filed: Nov. 4, 2010

(65) Prior Publication Data

US 2011/0110346 A1   May 12, 2011

(30) Foreign Application Priority Data

Nov. 6, 2009 (KR) .................. 10-2009-0106736

(51) Int. Cl.
*H04W 4/00* (2009.01)

(52) U.S. Cl.
USPC ............ 370/331; 370/312; 370/338; 370/349

(58) Field of Classification Search
USPC ......... 370/312, 328, 331, 336, 338, 343, 349, 370/478; 455/435.1
See application file for complete search history.

(56) References Cited

U.S. PATENT DOCUMENTS

| | | | |
|---|---|---|---|
| 2005/0079867 A1* | 4/2005 | Balachandran et al. ... | 455/435.1 |
| 2006/0068793 A1 | 3/2006 | Van Lieshout et al. | |
| 2006/0126590 A1* | 6/2006 | Putcha et al. .................. | 370/343 |
| 2007/0030830 A1* | 2/2007 | Sagne et al. .................. | 370/336 |
| 2008/0056219 A1 | 3/2008 | Venkatachalam | |
| 2008/0095195 A1* | 4/2008 | Ahmadi et al. ............... | 370/478 |
| 2008/0247372 A1 | 10/2008 | Chion et al. | |
| 2009/0109890 A1* | 4/2009 | Chow et al. .................... | 370/312 |
| 2010/0061289 A1* | 3/2010 | Mun et al. ..................... | 370/312 |
| 2010/0202336 A1* | 8/2010 | Cheng et al. .................. | 370/312 |

FOREIGN PATENT DOCUMENTS

| | | |
|---|---|---|
| CN | 101167330 A | 4/2008 |
| CN | 101222751 A | 7/2008 |
| EP | 2 109 338 A1 | 10/2009 |

OTHER PUBLICATIONS

Jan Suumaki, Zexian Li, Andrea Bacioccola, Proposed Text of Multi-Carrier—MBS Co-operation (15.2.7.2.11) for the IEEE 802.16m Amendment, IEEE C802.16m—Sep. 1933, IEEE 802.16 Task Group m (TGm), Aug. 28, 2009.

(Continued)

*Primary Examiner* — Brian D Nguyen
*Assistant Examiner* — Toan Nguyen
(74) *Attorney, Agent, or Firm* — Jefferson IP Law, LLP

(57) ABSTRACT

A switching method and apparatus in a broadband wireless communication system is provided. A method of an Advanced Base Station (ABS) for a Multicast Broadcast Service (MBS) in the broadband wireless communication system includes transmitting to an Advanced Mobile Station (AMS) a message including identification information for a primary carrier that provides the MBS among multiple carriers supported by the ABS, switching to the primary carrier with respect to the AMS, and transmitting MBS data through the primary carrier.

12 Claims, 17 Drawing Sheets

(56) References Cited

OTHER PUBLICATIONS

Etemad Kamran, Muthaiah Venkatachalam, Proposed AWD text for EMBS, IEEE C80216m-0912101, IEEE 802.16 Task Group m (TGm), Aug. 30, 2009.

Kaushik Josiam, Yan-Xiu Zheng, Amendment Text on 802.16m Amendment on the Enhanced Multicast Broadcast Services: Recommended AWD Text Proposal from E-MBS DG C80216m-09/2166r1, IEEE 802.16 Task Group m (TGm), Sep. 18, 2009.

Etemad Kamran, Muthaiah Venkatachalam, Proposed text for Group DSA for EMBS based on EMBS DG draft, IEEE C80216m-09/2186, IEEE 802.16 Task Group m (TGm), Sep. 20, 2009.

Nan Li, Kaiying Lv, E-MBS Transmission for Multi-Carrier Delpoyment, IEEE C802.16m-09/1777, IEEE 802.16 Task Group m (TGm), Aug. 29, 2009.

* cited by examiner

SWITCHING METHOD AND APPARATUS IN BROADBAND WIRELESS COMMUNICATION SYSTEM

PRIORITY

This application claims the benefit under 35 U.S.C. §119(a) of a Korean patent application filed in the Korean Intellectual Property Office on Nov. 6, 2009 and assigned Serial No. 10-2009-0106736, the entire disclosure of which is hereby incorporated by reference.

BACKGROUND OF THE INVENTION

1. Field of the Invention

The present invention relates to a wireless communication system. More particularly, the present invention relates to a switching method and apparatus for receiving Multicast Broadcast Service (MBS) data in a wireless communication system using multiple carriers.

2. Description of the Related Art

In a next generation system, i.e., a $4^{th}$ Generation (4G) communication system, research and commercialization are underway to provide users with various services having a data rate of about 100 Mbps or higher. In particular, the 4 G communication system is currently being developed to ensure mobility and Quality of Service (QoS) in a Broadband Wireless Access (BWA) communication system, such as a Wireless Local Area Network (WLAN) system and a Wireless Metropolitan Area Network (WMAN) system. A representative example of such a communication system is an Institute of Electrical and Electronics Engineers (IEEE) 802.16 communication system.

At present, standardization on IEEE 802.16m is ongoing as an advanced standard of the existing IEEE 802.16e. From the perspective of deployment of network equipment, a system that supports both the IEEE 802.16e and the IEEE 802.16m systems will be implemented in a transitory manner as compared to a system dedicated for IEEE 802.16m. Therefore, when an Advanced Mobile Station (AMS) moves from an IEEE 802.16e system to an IEEE 802.16e/16m combination system, a system controls the AMS to perform zone switching to a new system since it is a system having a different property from that of an existing system that supports the AMS in a corresponding zone.

FIG. 1 illustrates a zone switching scenario in a wireless communication system according to a conventional method.

Referring to FIG. 1, a mixed Base Station (BS) (or an Advanced BS (ABS)) 104 is provided that supports both an IEEE 802.16e system and an IEEE 802.16m system. An AMS 102 is provided that performs zone switching to the IEEE 802.16e system while receiving a service from the IEEE 802.16m system. Herein, a zone that supports the IEEE 802.16m system is referred to as an M zone 105, and a zone that supports the IEEE 802.16e system is referred to as an L zone 107.

In step 106, the serving ABS 104, i.e., a serving ABS of the AMS 102, sets HO_Mode=0b01 for indicating zone switching in an AAI_HandOver-CoMmanD (AAI_HO-CMD) message in the M zone 105 and then transmits the AAI_HO-CMD message to the AMS 102. In step 108, the serving ABS 104 performs synchronization with respect to the L zone 107 by using IEEE 802.16e PHYsical layer (PHY) information included in the AAI_HO-CMD message. Upon completion of the synchronization, in step 110, the AMS 102 transmits a RaNGing-REQuest (RNG-REQ) message in which a ranging purpose indication value is set to 1 to attempt re-entry to the L zone 107 of the mixed BS 104. In response thereto, the mixed BS 104 transmits a RaNGing-ReSPonse (RNG-RSP) message to report whether ranging is performed in step 112. Upon completion of the ranging process, in step 114, the AMS 102 determines whether a data path is established normally, and performs communication through the switched L zone 107.

The conventional wireless communication system performs zone switching of the AMS as described above. In order for the AMS that performs the zone switching to receive MBS data, after completion of the zone switching, Dynamic Service Addition-REQuest (DSA-REQ) and Dynamic Service Addition-ReSPonse (DSA-RSP) messages are transmitted and received through the switched zone to establish a data path for an MBS. However, a method of establishing the data path for the MBS by transmitting and receiving the DSA-REQ and DSA-RSP messages after completion of the zone switching has a disadvantage in that a time required to receive the MBS data, i.e., a delay time, is increased. Therefore, there is a need for a method of decreasing a delay time of receiving the MBS data.

SUMMARY OF THE INVENTION

An aspect of the present invention is to address at least the above-mentioned problems and/or disadvantages and to provide at least the advantages described below. Accordingly, an aspect of the present invention is to provide a method and apparatus for performing zone switching to receive Multicast Broadcast Service (MBS) data in a broadband wireless communication system.

Another aspect of the present invention is to provide a method and apparatus for obtaining MBS data reception information before zone switching in a broadband wireless communication system.

Another aspect of the present invention is to provide a method and apparatus for obtaining zone switching information and MBS data reception information and for performing zone switching and establishing an MBS data path in a broadband wireless communication system using multiple carriers.

Another aspect of the present invention is to provide a method and apparatus in which an Advanced Base Station (ABS) provides an Advanced Mobile Station (AMS) with information on a carrier that provides an MBS so that the AMS performs switching to the carrier that provides the MBS in a broadband wireless communication system using multiple carriers.

In accordance with an aspect of the present invention, a method of an ABS for an MBS in a broadband wireless communication system is provided. The method includes transmitting to an AMS a message including identification information for a primary carrier that provides the MBS among multiple carriers supported by the ABS, switching to the primary carrier with respect to the AMS, and transmitting MBS data through the primary carrier.

In accordance with another aspect of the present invention, a method of an AMS for an MBS in a broadband wireless communication system is provided. The method includes receiving a message including identification information for a primary carrier that provides the MBS from an ABS, switching to the primary carrier, and receiving MBS data through the primary carrier.

In accordance with another aspect of the present invention, an apparatus of an ABS for an MBS in a broadband wireless communication system is provided. The apparatus includes a communication unit for processing a signal transmitted to and received from an AMS, and a controller for transmitting to the AMS a message including identification information for a primary carrier that provides the MBS among multiple carriers supported by the ABS by controlling the communication unit, for switching to the primary carrier with respect to the AMS, and for transmitting MBS data through the primary carrier.

In accordance with another aspect of the present invention, an apparatus of an AMS for an MBS in a broadband wireless communication system is provided. The apparatus includes a communication unit for processing a signal transmitted to and received from an ABS, and a controller for receiving a message including identification information for a primary carrier that provides the MBS from the ABS by controlling the communication unit, for switching to the primary carrier, and for receiving MBS data through the primary carrier.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
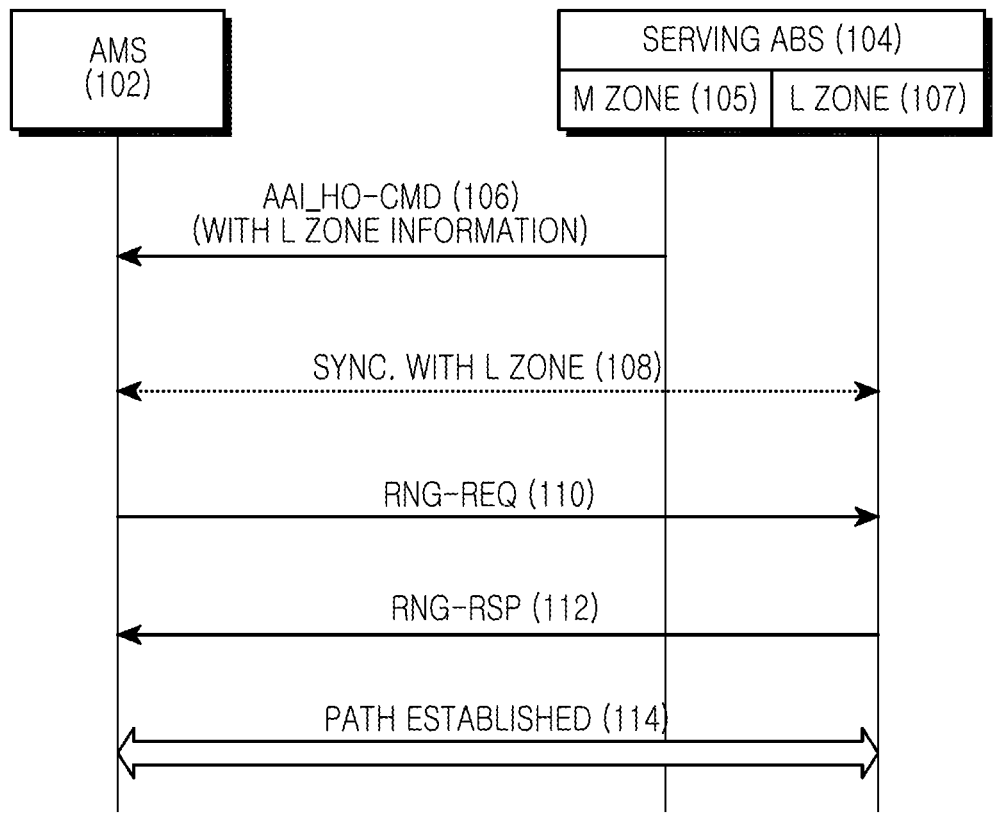
FIG. 1 illustrates a zone switching scenario in a wireless communication system according to a conventional method.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described below relate to a method and apparatus for obtaining switching information and Multicast and Broadcast Service (MBS) data reception information and for switching to a location for providing an MBS and establishing an MBS data path in a broadband wireless communication system using multiple carriers.

Although an Orthogonal Frequency Division Multiplexing (OFDM)/Orthogonal Frequency Division Multiple Access (OFDMA) type wireless communication system will be used in the description below, the present invention can equally be applied to other types of wireless communication systems without limitation.

An exemplary system considered in the present invention supports a plurality of wireless standards. For example, the plurality of wireless standards may be at least two standards such as a legacy standard and an enhanced standard evolved from the legacy standard. As an example, the plurality of wireless standards may be an Institute of Electrical and Electronics Engineers (IEEE) 802.16e standard and an IEEE 802.16m standard. In the present invention as described below, for convenience of explanation, a system that supports the IEEE 802.16e standard and the IEEE 802.16m standard is described for example, and the IEEE 802.16e is simply referred to as '16e' and the IEEE 802.16m is simply referred to as '16m'. Of course, this should not be considered as limiting the application of the invention as it may be applied to a communication system using any standard.

In addition, in the present invention, a zone is defined as a unit that divides a physical resource to support the plurality of standards. Herein, one standard corresponds to one zone. Hereinafter, for convenience of explanation, a zone for the 16e standard is referred to as an 'L zone', a zone for the 16m standard is referred to as an 'M zone', and a Base Station (BS) supporting both the 16e standard and the 16m standard is referred to as a mixed BS (or an Advanced BS (ABS)). Further, it is assumed in the present invention that an Advanced Mobile Station (AMS) supports both the 16e standard and the 16m standard.

In exemplary embodiments of the present invention, when zone switching to the M zone or the L zone has to be performed in a situation where the AMS needs to receive an MBS, the AMS and the ABS transmit and receive Dynamic Service Addition-REQuest (DSA-REQ) and Dynamic Service Addition-ReSPonse (DSA-RSP) messages of the present invention and thus obtain, in advance, information required to provide the MBS before the AMS performs the zone switching. Therefore, a connection path for the MBS may be established promptly after the zone switching.

Table 1 illustrates a configuration of an exemplary DSA-REQ message of the present invention.

TABLE 1

| Syntax | Size | Notes |
| --- | --- | --- |
| DSA-REQ( ) | | |
| Management Message Type | TBD | TBD |
| MSTID + MFID | TBD | MSTID + MFID for requesting MBS service |
| Service Flow Parameter Convergence Sublayer Parameter Encodings | Variable Variable | |
| CMAC Tuple | | The number of included Extended AMBS DATA IEs |

Herein, the 'Mobile STation IDentifier (MSTID)+Multicast Flow IDentifier (MFID)' denotes an MBS address in the M zone, and the 'CMAC Tuple' denotes a cipher-based message authentication code.

Table 2 below illustrates a configuration of an exemplary DSA-RSP message of the present invention.

TABLE 2

| Syntax | Size | Notes |
| --- | --- | --- |
| DSA-RSP( ){ | | |
| Management message Type | TBD | TBD |
| Confirmation code | TBD | Entire Corresponding DSA-REQ |
| If(Confirmation code== 0x01){ | | |
| Mapping MCID | TBD | |
| Service Flow Parameter Convergence Sublayer Parameter Encodings | variable variable | |
| PHY preamble | TBD | Counterpart to zone characteristic |
| FA index | TBD | For M zone only |
| } | | |
| CMAC Tuple | | The number of included Extended AMBS DATA IEs |
| } | | |

Herein, the Multicast Connection IDentifier (MCID) denotes an MBS address in the L zone, i.e., an MBS address of the L zone corresponding to the MBS of the M zone indicated by the MSTID+MFID of Table 1 above. In addition, the FA index denotes a carrier that provides an MBS desired by the AMS in the M zone. The FA index is not included in case of zone switching to the L zone, and is included only in case of zone switching to the M zone.

Herein, Table 1 and Table 2 above illustrate the DSA-REQ and DSA-RSP messages transmitted and received when the AMS is switched from the M zone to the L zone as an example. When the AMS is switched from the L zone to the M zone, an MBS address included in the DSA-REQ and DSA-RSP messages will change. That is, when the AMS is switched from the L zone to the M zone, the MCID is included in the DSA-REQ message, and the 'MSTID+MFID' is included in the DSA-RSP message. In addition, since a Media Access Control (MAC) Packet Data Unit (PDU) itself is encrypted in the M zone, the 'CMAC Tuple' is not included in case of zone switching to the M zone.

Now, a case where an AMS which uses a mixed BS as a serving ABS performs zone switching in the coverage of the mixed BS by using DSA-REQ and DSA-RSP messages and a case where the AMS performs zone switching to another BS will be described.

First, an exemplary case where the AMS which uses the mixed BS as the serving ABS performs zone switching from an M zone to an L zone in the coverage of the mixed BS will be described with reference to FIG. 2 and FIG. 3. It is assumed herein that the mixed BS provides an MBS in the L zone. The reason of providing the MBS in the L zone is to allow MSs that support only 16e to be able to receive the MBS.

Figure 2:
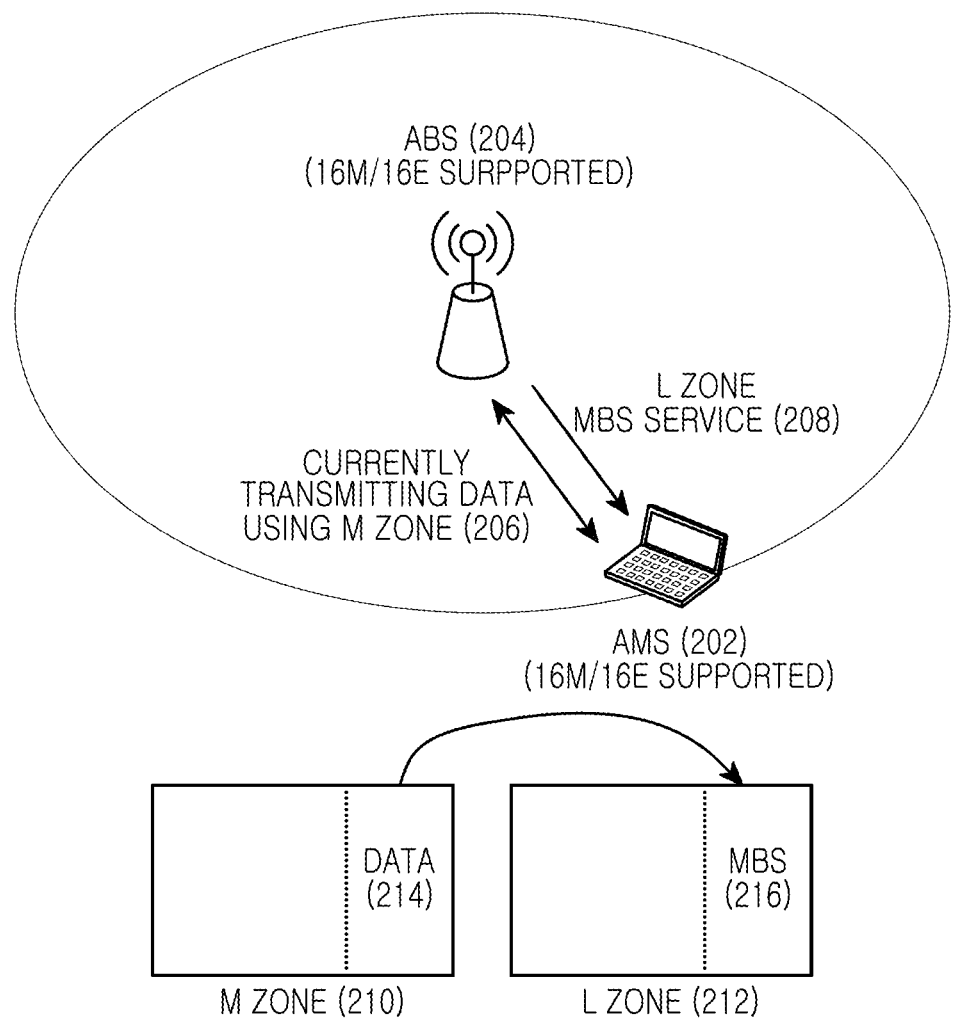
FIG. 2 illustrates a structure of a wireless communication system according to an exemplary embodiment of the present invention.

FIG. 2 illustrates a structure of a wireless communication system according to an exemplary embodiment of the present invention.

Referring to FIG. 2, an AMS 202 is registered to a mixed BS (or an ABS) 204 and an M zone 210. After completion of the registration, the AMS 202 transmits and receives data, in step 206. At this moment, the AMS 202 may have already performed initial network entry or may be performing communication after registration with the network.

The AMS 202 transmits and receives a DSA-REQ message and a DSA-RSP message to and from the mixed BS 204 independently from data 214 transmitted in the M zone 210 to which the AMS 202 is currently being accessed for an MBS. Thus, after obtaining information required to receive an MBS 216, a connection path is established by switching to an L zone 212, and the MBS 216 is received using the obtained information in step 208.

That is, as described in Table 1 above, the AMS 202 transmits the DSA-REQ message including an MSTID+MFID (i.e., an address of the M zone 210 of the MBS desired by the AMS 202), CMAC Tuple, QoS information, and a PHY parameter to the mixed BS 204, and, upon receiving this message, as described in Table 2 above, the mixed BS 204 obtains an MCID corresponding to the MSTID+MFID in the L zone 212. The mixed BS 204 then transmits essential information required to receive MBS data in the L zone 212 and the DSA-RSP message including the MCID to the AMS 202.

Figure 3:
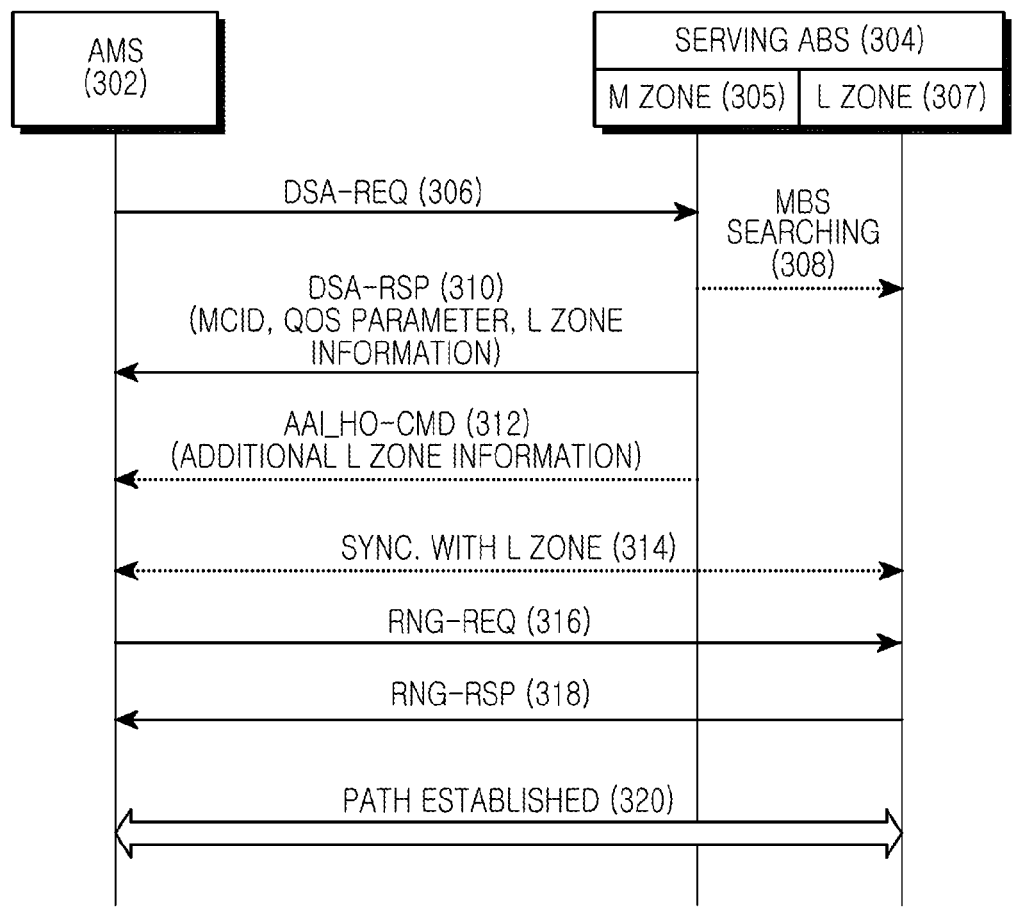
FIG. 3 illustrates a zone switching scenario for receiving Multicast Broadcast Service (MBS) data in a wireless communication system according to an exemplary embodiment of the present invention.

FIG. 3 illustrates a zone switching scenario for receiving MBS data in a wireless communication system according to an exemplary embodiment of the present invention.

Referring to FIG. 3, an AMS 302 transmits a DSA-REQ message to a mixed BS (or an ABS) 304 to establish a connection path for an MBS in step 306. In this case, as described in Table 1 above, the AMS 302 transmits the DSA-REQ message including MSTID+MFID information designated for the MBS and corresponding Quality of Service (QoS) information to the mixed BS 304.

Upon receiving the DSA-REQ message, the mixed BS 304 recognizes that the AMS 302 intends to receive the MBS by using the MSTID+MFID. In step 308, the mixed BS 304 searches for a service corresponding to the MSTID+MFID in an L zone 307 for providing the MBS, and if the service exists, obtains an MCID of the service and its related information.

In step 310, in response to the DSA-REQ message, the mixed BS 304 creates a DSA-RSP message and transmits the created message to the AMS 302. If the service corresponding to the MSTID+MFID does not exist in the L zone 307, the mixed BS 304 sets a confirmation code field of the DSA-RSP message described in Table 2 above to 0x00 and transmits the message to the AMS 302. Otherwise, if the service corresponding to the MSTID+MFID exists in the L zone 307, the mixed BS 304 sets the confirmation code field to 0x01 as described in Table 2 above, and transmits the DSA-RSP message to the AMS 302. The DSA-RSP message includes an MCID which is used in the service in the L zone 307 and a PHY preamble, a service flow parameter, a CMAC Tuple, etc., which are to be used in the L zone 307.

In addition, in step 312, the mixed BS 304 may transmit additional information (e.g., connection maintenance information for an M zone 305) required for zone switching to the AMS 302 by appending the information to an AAI_HandOver-CoMmanD (AAI_HO-CMD) message.

In step 314, on the basis of the DSA-RSP message and the information included in the AAI_HO_CMD message, the AMS 302 adjusts synchronization to the L zone 307 of the mixed BS 304 and thus prepares to analyze a frame.

In step 316, the AMS 302 transmits a RaNGing-REQuest (RNG-REQ) message to the L zone 307. In step 318, the AMS 302 receives a RaNGing-ReSPonse (RNG-RSP) message from the L zone 307 and performs a network re-entry process. In step 320, when a connection to the L zone 307 is established, the AMS 302 receives MBS data from the L zone 307 by using MCID information required through the DSA-RSP message in the M zone 305.

Now, an exemplary case where an AMS which uses a mixed BS as a serving ABS performs zone switching to an L zone of another BS in an M zone in the coverage of the mixed BS, i.e., a case where a handover to another BS is required, will be described with reference to FIG. 4 and FIG. 5. It is assumed herein that a handover target BS supports only the L zone when a handover to a new BS is required due to movement of the AMS.

Figure 4:
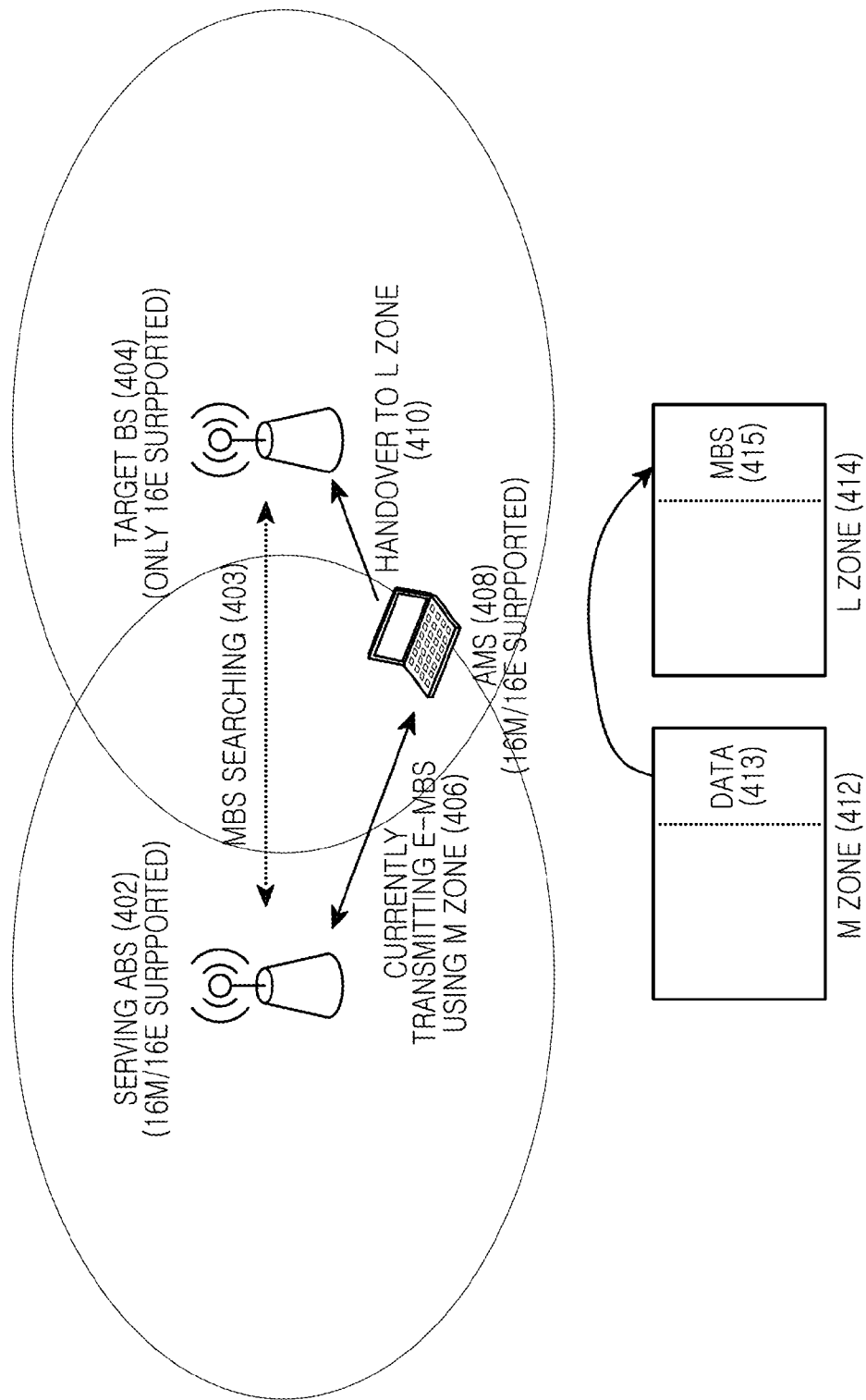
FIG. 4 illustrates a structure of a wireless communication system according to an exemplary embodiment of the present invention.

FIG. 4 illustrates a structure of a wireless communication system according to an exemplary embodiment of the present invention.

Referring to FIG. 4, an AMS 408 receives an E-MBS 413 in an M zone 412 from a mixed BS (or an ABS) 402, in step 406. Although it is assumed herein that the AMS 408 is currently receiving the E-MBS 413 in the M zone 412 of the mixed BS 402, the present invention may equally apply to a case where the AMS 408 is receiving another type of service or where the AMS 408 performs initial network entry.

In this case, if a handover is required due to mobility of the AMS 408, the mixed BS 402 instructs the AMS 408 to perform a handover to a target BS 404, and receives a DSA-REQ message from the AMS 408. Upon receiving the DSA-REQ message, the mixed BS 402 searches for a service corresponding to the E-MBS proposed by the handover target BS 404 through a backbone network, in step 403. If the handover target BS 404 is currently providing an MBS 415 corresponding to the E-MBS 413 in the L zone 414, the mixed BS 402 transmits to the AMS 408 a DSA-RSP message including switching information for the L zone 414 and information related to the MBS 415.

Upon receiving the DSA-RSP message, the AMS 408 performs zone switching from the mixed BS 402 to the L zone, and receives the MBS 415 from the target BS 404 by performing a handover to the L zone 414 of the target BS 404, in step 410. When multiple carriers are used in the M zone 412 of the mixed BS 402, the AMS 408 may maintain a connection with the M zone 412 to ensure a seamless service with respect to the E-MBS 415.

Figure 5:
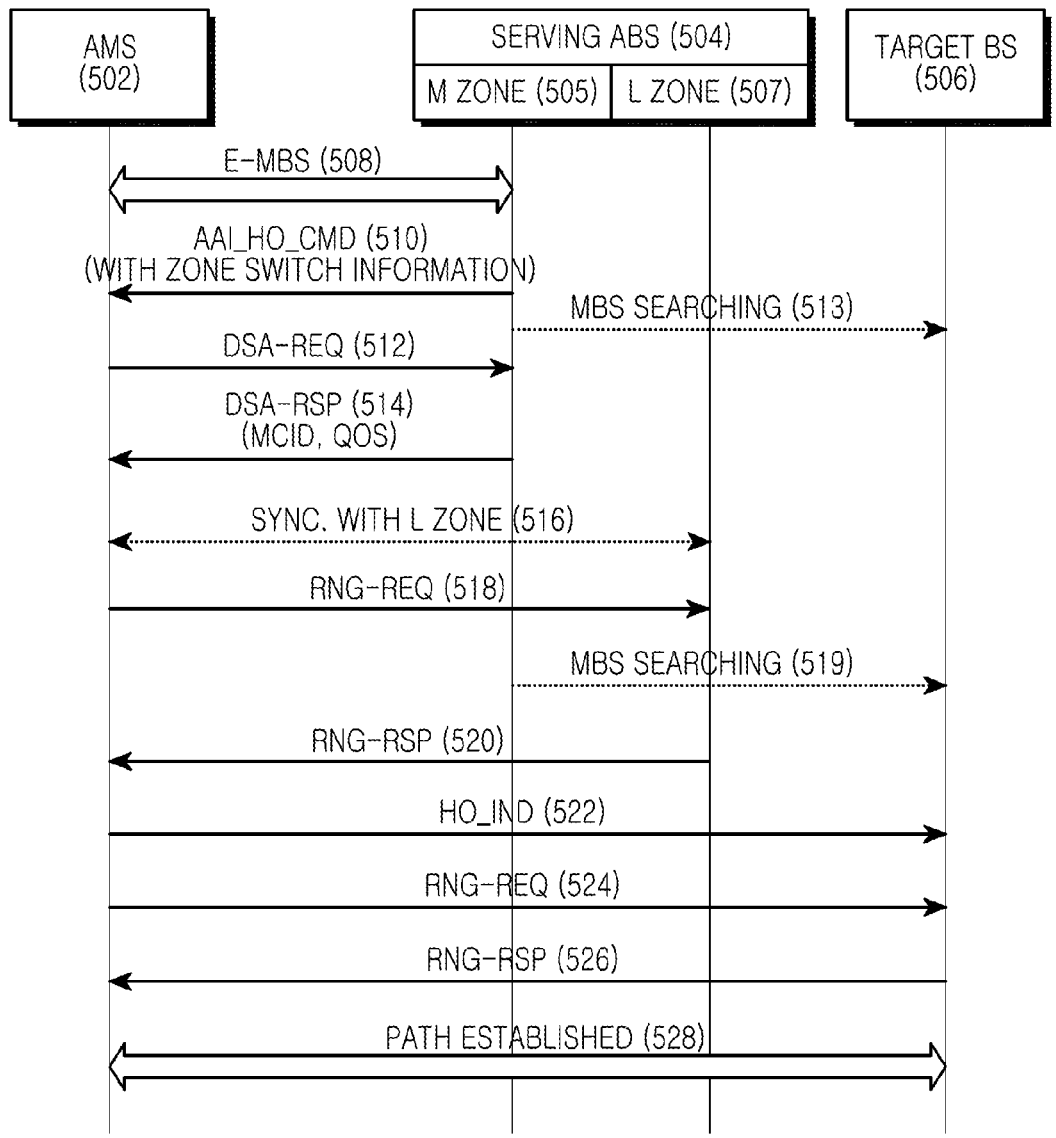
FIG. 5 illustrates a zone switching scenario for receiving MBS data in a wireless communication system according to an exemplary embodiment of the present invention.

FIG. 5 illustrates a zone switching scenario for receiving MBS data in a wireless communication system according to an exemplary embodiment of the present invention.

Referring to FIG. 5, an AMS 502 receives an E-MBS in an M zone 505 of a serving mixed BS (or ABS) 504 in step 508. In this case, if a handover is required due to mobility of the AMS 502, the mixed BS 504 transmits to the AMS 502 an AAI_HO_CMD message for instructing a handover to a target BS 506 in step 510. The AAI_HO_CMD message may indicate that the target BS 506 is a BS that supports only an L zone.

Upon receiving the AAI_HO_CMD message, the AMS 502 transmits a DSA-REQ message to the mixed BS 504 in step 512. In this case, as described in Table 1 above, by appending an MSTID+MFID of the E-MBS received by the AMS 502 to the DSA-REQ message, the AMS 502 may request to determine whether a service corresponding to the E-MBS is provided from the target BS 506.

Upon receiving the DSA-REQ message, the mixed BS 504 searches for a service corresponding to the E-MBS and provided from the target BS 506 through a backbone network in step 513. In this case, the mixed BS 504 may search for an MCID corresponding to the MSTID+MFID to obtain the MCID.

When the target BS 506 provides the service corresponding to the E-MBS, the mixed BS 504 transmits to the AMS 502 a DSA-RSP message including the MCID or the service and information related to the MCID (e.g., QoS information) in step 514. That is, the DSA-RSP message is configured as described in Table 2 above. If the target BS 506 does not provide the service corresponding to the E-MBS, the mixed BS 504 transmits the DSA-RSP message to the AMS 502 by setting a confirmation code field to 0x00. In this case, if the target BS 506 provides the service, the confirmation code field of the DSA-RSP message is set to 0x01.

Upon receiving the DSA-RSP message, proceeding to step 516, the AMS 502 adjusts synchronization to an L zone 507 of the mixed BS 504 by using zone switching information included in the AAI_HO_CMD message. In step 518, the AMS 502 performs a ranging process for zone switching by transmitting an RNG-REQ message to the L zone 507 of the mixed BS 504. In this case, if the confirmation code field of the DSA-RSP message is set to 0x00, the AMS 502 may promptly recognize that an MBS cannot be maintained after a handover and may report this to a user.

In step 519, the mixed BS 504 re-searches for MBS related information of the target BS 506 through the backbone network to determine whether there are changes. In step 520, the mixed BS 504 transmits an RNG-RSP message to the AMS 502. In this case, if the re-search result shows that there are changes, the mixed BS 504 may transmit the RNG-RSP message by appending the changes to the RNG-RSP message.

Upon receiving the RNG-RSP message, in step 522, the AMS 502 transmits a HandOver_INDication (HO_IND) message to the target BS 506 to report that a handover is performed. In step 524, the AMS 502 transmits an RNG-REQ message to the target BS 506. In step 526, the AMS 502 receives an RNG-RSP message from the target BS 506. In step 528, the AMS 502 establishes a connection path to the target BS 506. Thereafter, the AMS 502 receives an MBS from the target BS 506 using the MBS related information received in advance through the DSA-RSP message.

Now, an exemplary AMS which uses a mixed BS that supports multiple carriers as a serving ABS performs zone switching in the coverage of the serving ABS for an E-MBS will be described with reference to FIG. 6 and FIG. 7. It is assumed herein that the serving ABS supports the multiple carriers and an MBS is provided using one carrier among the multiple carriers.

Figure 6:
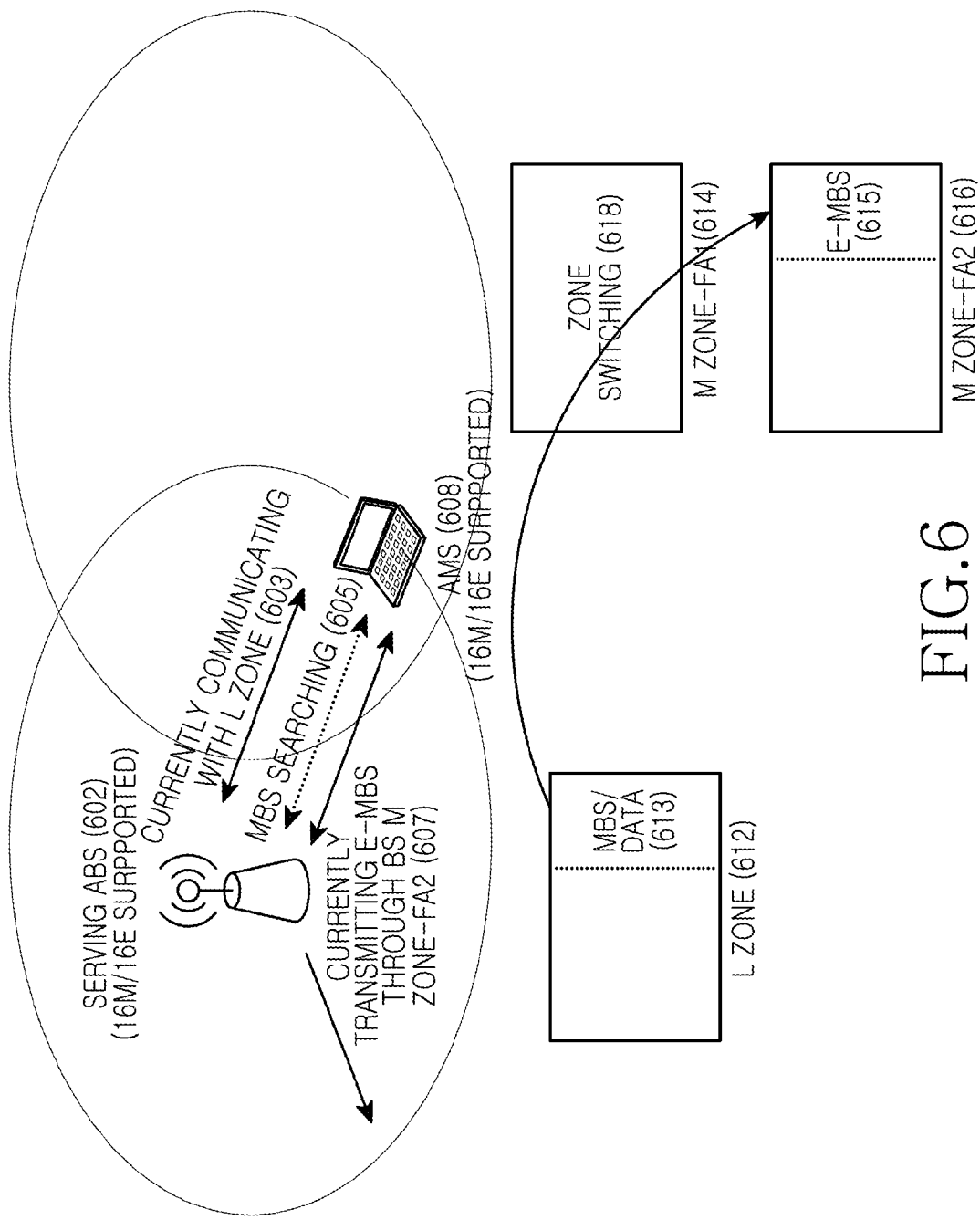
FIG. 6 illustrates a structure of a wireless communication system according to an exemplary embodiment of the present invention.

FIG. 6 illustrates a structure of a wireless communication system according to an exemplary embodiment of the present invention.

Referring to FIG. 6, an AMS 608 transmits and receives data in an L zone 612 to and from a serving ABS 602, in step 603. In this case, a new E-MBS is requested or the AMS 608 has to use an E-MBS 615 provided in M zones 614 and 616 by the serving ABS 602 for a certain reason.

The AMS 608 transmits a DSA-REQ message to the serving ABS 602 by appending an MCID of the E-MBS to be received by the AMS 608 and its related information to the DSA-REQ message proposed in the present invention. In step 605, the serving ABS 602 searches for the E-MBS of the M zones 614 and 616, and transmits a DSA-RSP message to the AMS 608 by appending the search result to the DSA-RSP message proposed in the present invention. If it is assumed herein that each carrier of the M zones 614 and 616 has a different BSID, the serving ABS 602 transmits to the AMS 608 the DSA-RSP message including MSTID+MFID information mapped to the M zones 614 and 616, its corresponding information, e.g., QoS, CMAC, etc. On the other hand, if it is assumed that the serving ABS 602 has one BSID in the M zones 614 and 616 and transmits multiple carriers, the AMS 608 does not the specific carrier in which the E-MBS desired by the AMS 608 is provided. Thus, the serving ABS 602 transmits to the AMS 608 an FA index of the M zone 616 in step 607 by appending the FA index to the DSA-RSP message. Accordingly, it is possible to avoid a case where the AMS 608 accesses to a primary carrier of the M zone, i.e., an FA1 of the M zone 614, and then changes a current carrier to a secondary carrier, i.e., an FA2 of the M zone 616.

Thereafter, the AMS 608 obtains information required to receive the MBS 615 from the DSA-RSP message, establishes a connection path by performing zone switching to the FA2 of the M zone 616 in step 618, and receives the MBS 615 by using the obtained information.

Figure 7:
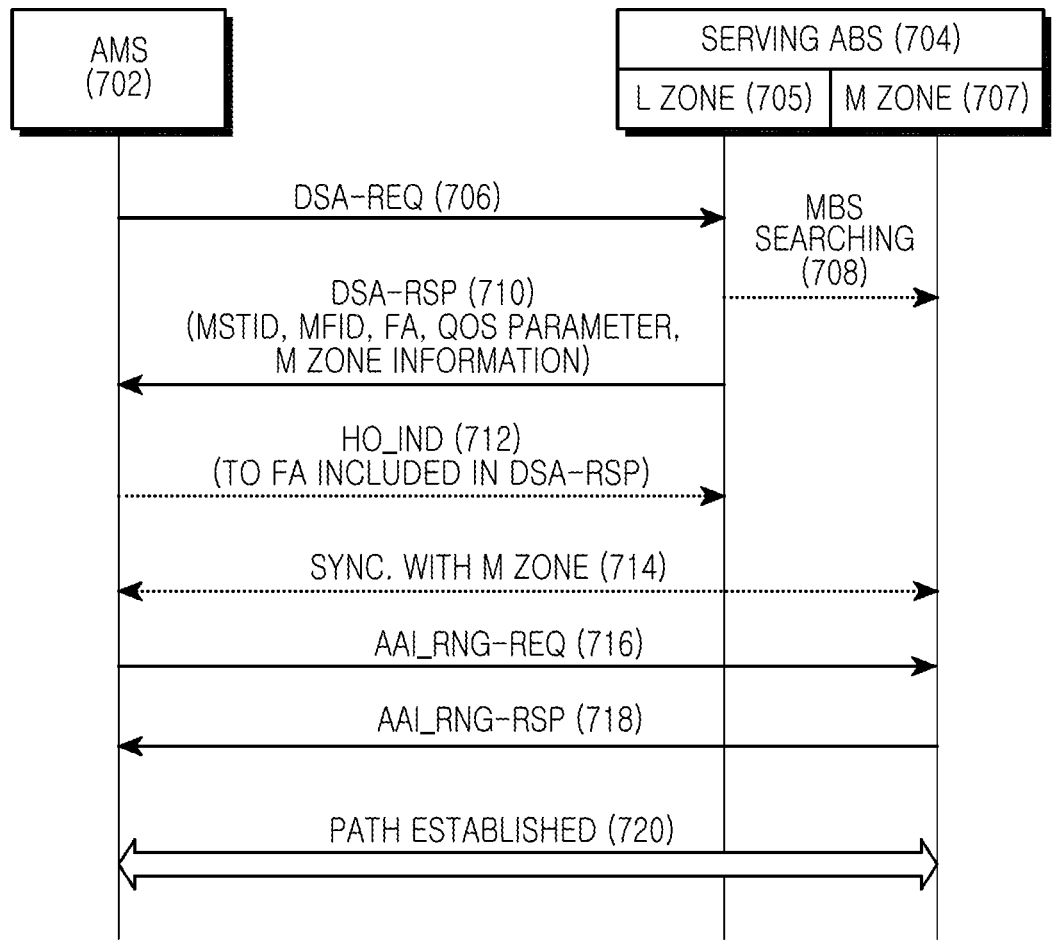
FIG. 7 illustrates a zone switching scenario for receiving MBS data in a wireless communication system according to an exemplary embodiment of the present invention.

FIG. 7 illustrates a zone switching scenario for receiving MBS data in a wireless communication system according to an exemplary embodiment of the present invention.

Referring to FIG. 7, an AMS 702 transmits a DSA-REQ message to a serving ABS 704 in an L zone 705 to establish a connection path for an MBS in step 706. In this case, the DSA-REQ message transmitted by the AMS 702 to the serving ABS 704 includes MCID information designated for the MBS and corresponding QoS information as described in Table 1 above.

Upon receiving the DSA-REQ message, the serving ABS 704 recognizes that the AMS 702 intends to receive the MBS using an MCID. In step 708, the serving ABS 704 searches for a service corresponding to the MCID in an M zone 707 for providing the MBS, and, if the service exists, obtains an MSTID+MFID of the service and its related information.

In step 710, in response to the DSA-REQ message, the serving ABS 704 creates a DSA-RSP message and transmits the message to the AMS 702. In this case, if the service corresponding to the MCID does not exist in the M zone 707, the serving ABS 704 transmits the DSA-RSP message to the AMS 702 by setting a confirmation code field to 0x00. Otherwise, if the service corresponding to the MCID exists in the M zone 707, the serving ABS 704 sets the confirmation code field to 0x01 as described in Table 2 above, and transmits to the AMS 702 the DSA-RSP message including the MSTID+MFID which is used in the service in the M zone 707 and a PHY preamble, a service flow parameter, a CMAC Tuple, etc., which are to be used in the M zone 707. More particularly, when multiple carriers are transmitted using one BSID in the M zone 707, the mixed BS 704 transmits the DSA-RSP message by including an FA in which a corresponding MBS exists, so that the AMS 702 performs network re-entry without an error in a multi-carrier mode.

In step 712, the AMS 702 transmits an HO_IND message to the serving ABS 704. In this case, the HO_IND message reports that a handover will be performed to the FA included in the DSA-RSP message.

In step 714, the AMS 702 prepares to analyze a frame by adjusting synchronization to the M zone 707 of the serving ABS 704. The AMS 702 transmits an AAI_RNG-REQ message to the serving ABS 704 in step 716, and performs a network re-entry process by receiving an AAI_RNG-RSP message in response thereto in step 718, thereby completing zone switching to the M zone 707 of the serving ABS 704.

In step 720, when a connection path is established with the M zone 707 of the serving ABS 704, the AMS 702 receives the MBS from the M zone 707 by using MSTID+MFID information received through the DSA-RSP message in the L zone 705.

Now, an exemplary operation of an AMS and an ABS will be described in more detail according to the aforementioned exemplary embodiments.

Figure 8:
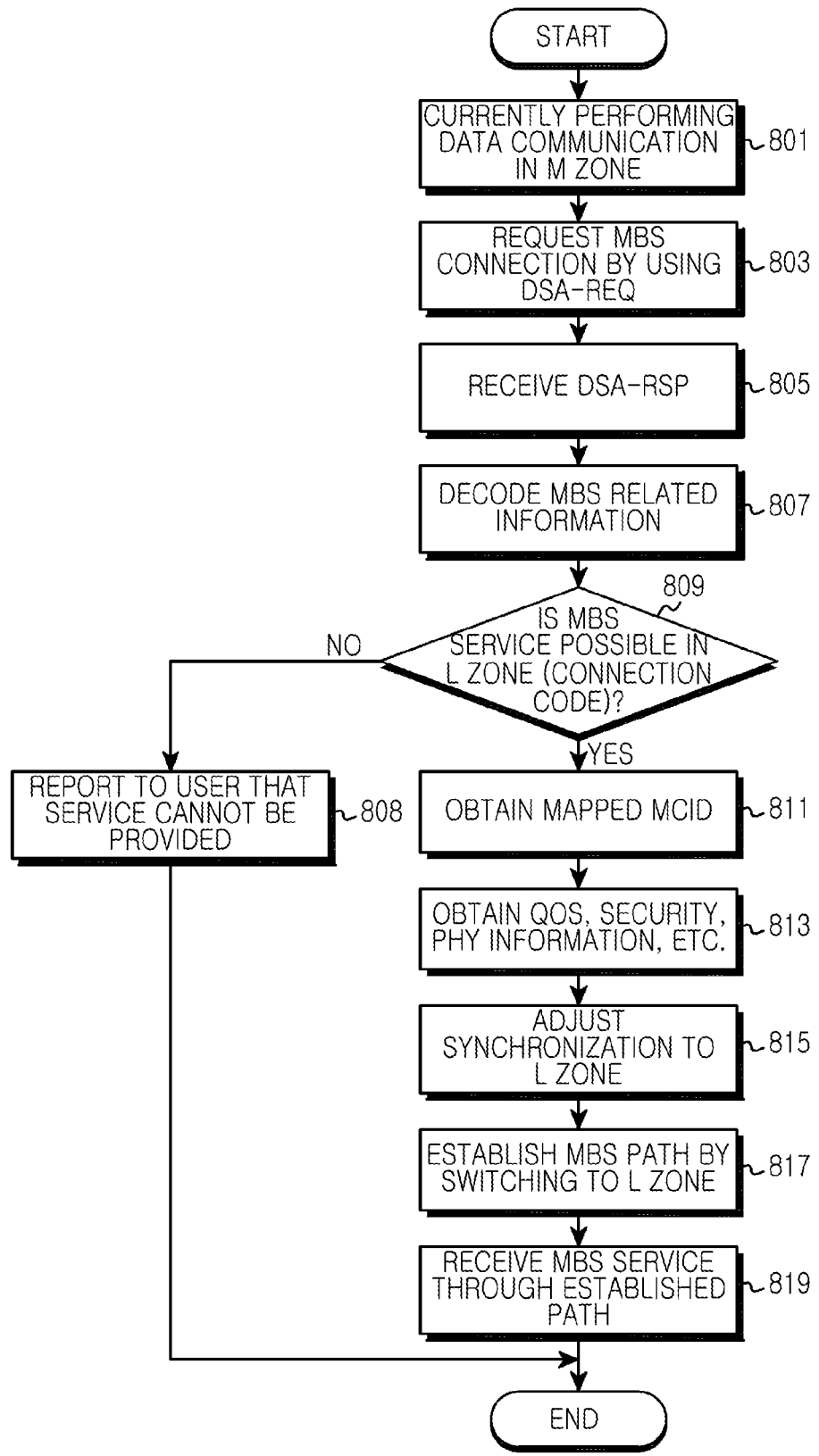
FIG. 8 illustrates a process of operating an Advanced Mobile Station (AMS) in a wireless communication system according to an exemplary embodiment of the present invention.

FIG. 8 illustrates a process of operating an AMS in a wireless communication system according to an exemplary embodiment of the present invention. In the following example, a serving ABS of the AMS is a mixed BS, and the AMS performs zone switching to an L zone in order to receive a new MBS in an M zone of the mixed BS.

Referring to FIG. 8, the AMS performs data communication through the M zone of the mixed BS in step 801. In this case, the mixed BS and the AMS perform data communication by using either multiple carriers or a single carrier.

When the AMS intends to receive an MBS during data communication, proceeding to step 803, the AMS generates a DSA-REQ message of the present invention and transmits the message to the mixed BS to request an MBS connection. In this case, as described in Table 1 above, the DSA-REQ message includes an MSTID+MFID which corresponds to the MBS in the M zone and QoS (e.g., a service flow parameter), a PHY parameter, and CMAC Tuple which are related to the MBS. In this case, the AMS may use an AAI_NeighBoR ADVertisement (AAI_NBR-ADV) message to determine whether an E-MBS service exists in the M zone.

In step 805, the AMS receives a DSA-RSP message including MBS related information in an L zone from the mixed BS. In step 807, the AMS decodes the MBS related information included in the DSA-RSP message. In this case, as described in Table 2 above, the DSA-RSP message includes information indicating whether the MBS is provided in the L zone, an MCID which corresponds to the MBS in the L zone, and QoS (e.g., a service flow parameter), a PHY preamble, and CMAC Tuple which are related to the MBS.

In step 809, the AMS determines whether the MBS is provided in the L zone by using the decoding result. This may be determined by using a confirmation code field of the DSA-RSP message. For example, the AMS may determine that the MBS is not provided in the L zone if the confirmation code field is 0x00 and may determine that the MBS is provided in the L zone if the confirmation code field is 0x01.

If it is determined in step 809 that the MBS is not provided in the L zone, proceeding to step 808, the AMS reports to a user that the service cannot be provided, and then the procedure of FIG. 8 ends. Otherwise, if it is determined in step 809 that the MBS is provided in the L zone, proceeding to step 811, the AMS obtains an MCID included in the DSA-RSP message. That is, the AMS may obtain CID information by decoding the MCID of the L zone, corresponding to an MSTID+MFID of the M zone. In this case, if information included in the DSA-REQ message is not clear, a typical confirmation code name included in the DSA-RSP message changes, and a typical multicast CID is allocated to the AMS. In step 813, the AMS obtains the QoS, the PHY information (i.e., PHY preamble), and the security information (i.e., CMAC Tuple) related to the MBS and included in the DSA-RSP message.

In step 815, the AMS adjusts synchronization to a corresponding zone on the basis of zone switching information included in the DSA-RSP message. In step 817, the AMS establishes a connection path by performing zone switching to the L zone. In step 819, the AMS receives MBS data by using the pre-obtained MBS related information through the previous established connection path. Herein, the AMS may perform zone switching by adjusting synchronization to the L zone by using the PHY information, and thereafter may establish the connection path by performing network re-entry on the basis of the MCID.

Figure 9:
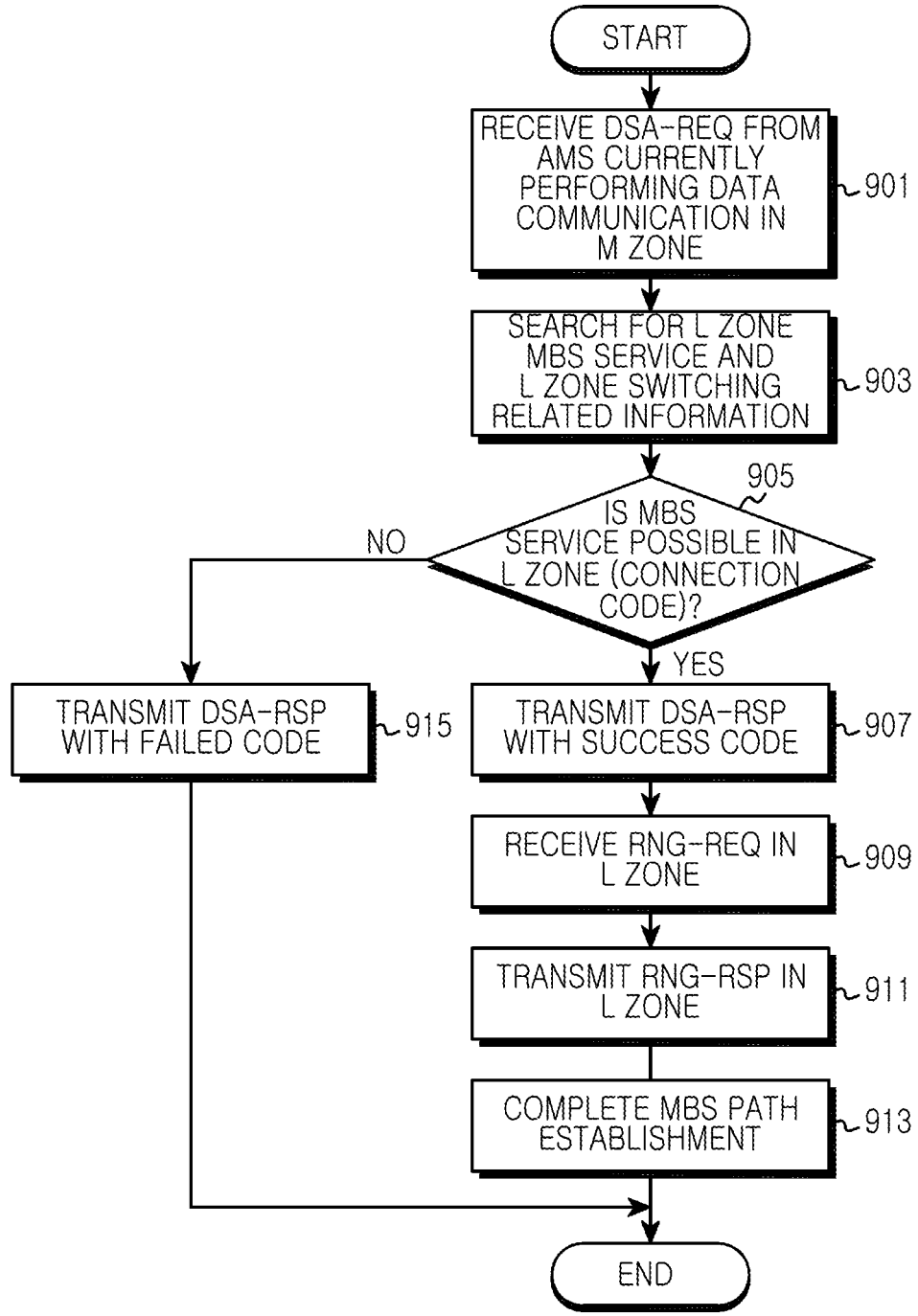
FIG. 9 illustrates a process of operating an Advanced Base Station (ABS) in a wireless communication system according to an exemplary embodiment of the present invention.

FIG. 9 illustrates a process of operating an ABS in a wireless communication system according to an exemplary embodiment of the present invention. It is assumed herein that the ABS is a mixed BS that supports both an M zone and an L zone, and an MBS is provided in the L zone. In addition, the mixed BS operates when a specific AMS intends to perform zone switching from the M zone to the L zone to receive a new MBS.

Referring to FIG. 9, the mixed BS receives a DSA-REQ message from an AMS which is currently performing data communication through the M zone in step 901. In this case, the BS may decode the DSA-REQ message transmitted by the AMS to recognize that the AMS intends to receive the MBS.

In step 903, the mixed BS determines whether a service desired by the AMS is provided in the L zone for providing the MBS service, that is, whether a service corresponding to an MSTID+MFID included in the DSA-REQ message is provided in the L zone, and searches for zone switching information for switching to the L zone.

In step 905, the mixed BS determines whether the MBS desired by the AMS is provided in the L zone according to the search result. If it is determined in step 905 that the MBS desired by the AMS is not provided in the L zone, proceeding to step 915, the mixed BS transmits to the AMS a DSA-RSP message by including a code indicating that the MBS desired by the AMS is not provided, and then the procedure of FIG. 9 ends. For example, the mixed BS sets a confirmation code field of the DSA-RSP message to 0x00 and then transmits the message to the AMS.

Otherwise, if it is determined in step 905 that the MBS desired by the AMS is provided in the L zone, proceeding to step 907, the mixed BS transmits to the AMS the DSA-RSP message by including a code indicating that the MBS desired by the AMS is provided. For example, the mixed BS sets the confirmation code field of the DSA-RSP message to 0x01 and transmits the message to the AMS. In this case, the DSA-RSP message includes information required for zone switching, and as described in Table 2 above, includes an MCID corresponding to the MBS provided in the L zone and its related information such as QoS, an FA index, a PHY preamble, etc.

In step 909, the mixed BS receives an RNG-REQ message from the AMS in the L zone. In response thereto, in step 911, the mixed BS transmits an RNG-RSP to the AMS. In step 913, the mixed BS establishes an MBS connection path with the AMS, and the procedure of FIG. 9 ends.

Figure 10:
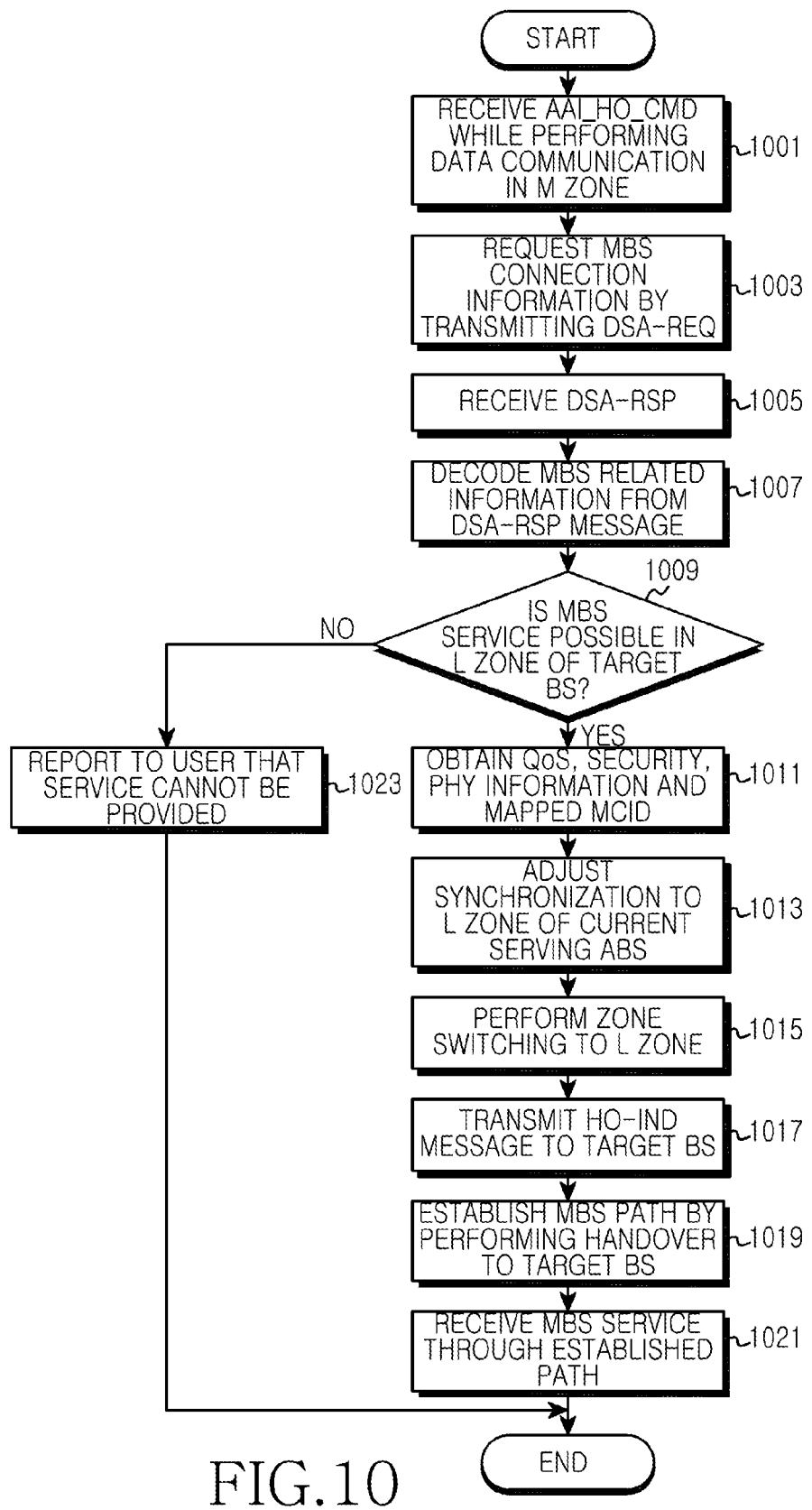
FIG. 10 illustrates a process of operating an AMS in a wireless communication system according to an exemplary embodiment of the present invention.

FIG. 10 illustrates a process of operating an AMS in a wireless communication system according to an exemplary embodiment of the present invention. Herein, a serving ABS of the AMS is a mixed BS, and the AMS performs zone switching to a target BS that supports only an L zone while performing communication in an M zone of the mixed BS.

Referring to FIG. 10, in step 1001, the AMS receives an AAI_HO_CMD message for instructing to handover to the target BS that supports only the L zone while receiving an MBS through the M zone of the mixed BS.

Upon receiving the AAI_HO_CMD message, in step 1003, the AMS transmits to the mixed BS a DSA-REQ message for requesting MBS connection information to receive the MBS from the target BS. In this case, as described in Table 1 above, the DSA-REQ message includes an MSTID+MFID which corresponds to the MBS in the M zone and QoS (e.g., a service flow parameter), a PHY parameter, and CMAC Tuple which are related to the MBS.

In step 1005, the AMS receives a DSA-RSP message including MBS related information from the target BS. In step 1007, the AMS decodes the MBS related information included in the DSA-RSP message. In this case, as described in Table 2 above, the DSA-RSP message includes information indicating whether the MBS is provided in the L zone, an MCID which corresponds to the MBS in the L zone, and QoS (e.g., a service flow parameter), a PHY preamble, and CMAC Tuple which are related to the MBS.

In step 1009, the AMS determines whether the MBS is provided in the target BS by using the decoding result. This may be determined using a confirmation code field of the DSA-RSP message. For example, the AMS may determine that the MBS is not provided in the target BS if the confirmation code field is 0x00 and may determine that the MBS is provided in the target BS if the confirmation code field is 0x01.

If it is determined in step 1009 that the MBS is not provided in the target BS, proceeding to step 1023, the AMS reports to a user that the service cannot be provided, and then the procedure of FIG. 10 ends.

Otherwise, if it is determined in step 1009 that the MBS is provided in the target BS, proceeding to step 1011, the AMS obtains the MCID included in the DSA-RSP message and the QoS, PHY information (i.e., PHY preamble), and security information (i.e., CMAC Tuple) related to the MBS and included in the DSA-RSP message.

In step 1013, the AMS adjusts synchronization to the L zone of the mixed BS on the basis of zone switching information included in the DSA-RSP message. In step 1015, the AMS performs zone switching to the L zone of the mixed BS. In step 1017, the AMS transmits an HO_IND message to the target BS. In step 1019, the AMS establishes an MBS connection path by performing a handover to the target BS. In step 1021, the AMS receives MBS data through the connection path established with the target BS by using the MBS related information pre-obtained from the DSA-RSP. Thereafter, the procedure of FIG. 10 ends.

Figure 11:
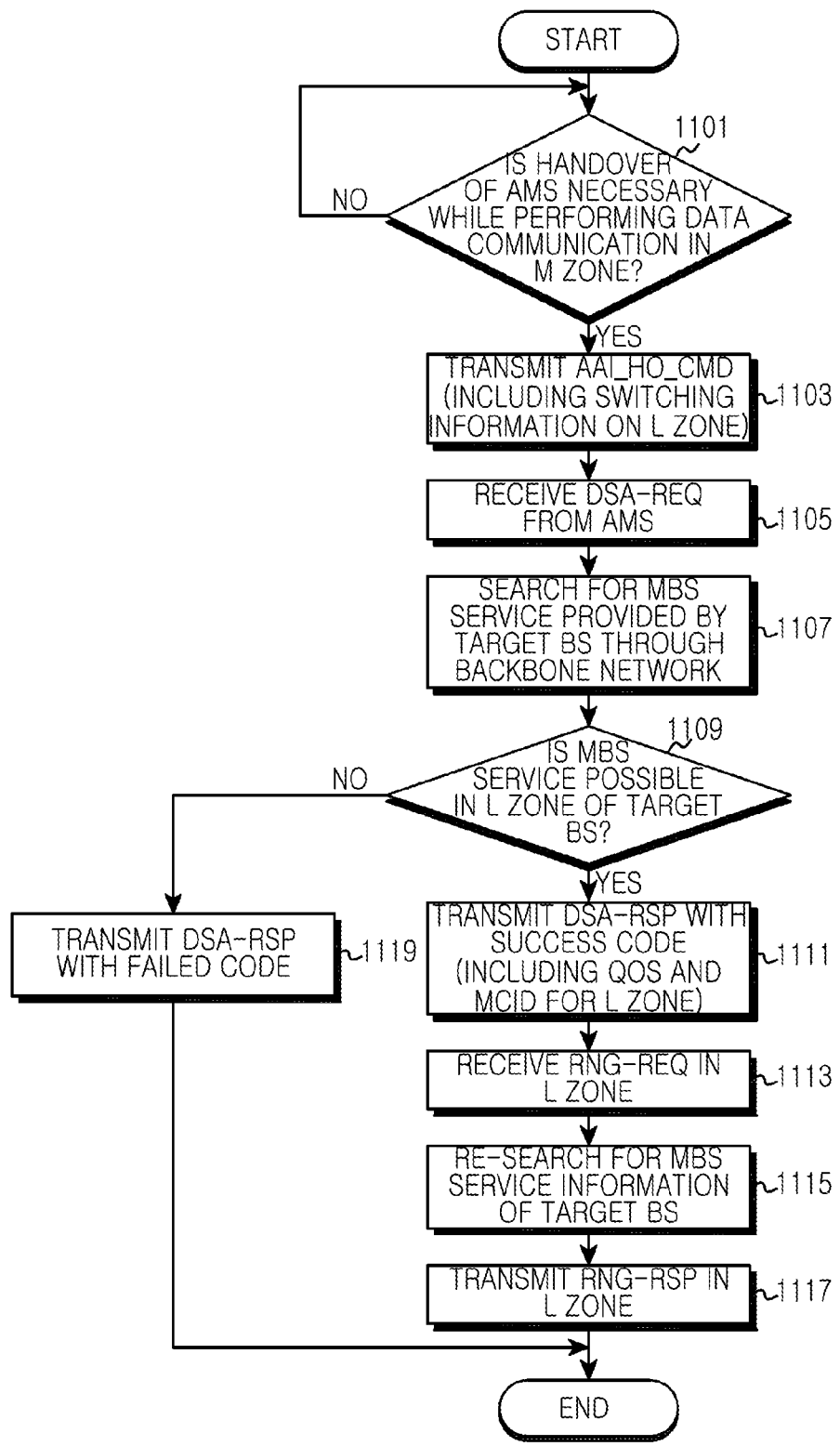
FIG. 11 illustrates a process of operating an ABS in a wireless communication system according to an exemplary embodiment of the present invention.

FIG. 11 illustrates a process of operating an ABS in a wireless communication system according to an exemplary embodiment of the present invention. Herein, the ABS is a mixed BS that supports both an M zone and an L zone, and an AMS performs a handover to a target BS that supports only the L zone while receiving an MBS in the M zone.

Referring to FIG. 11, in step 1101, it is determined if a handover of the AMS receiving the MBS through the M zone is necessary. If it is determined in step 1101 that handover of the AMS is necessary, the mixed BS determines the target BS or the AMS, and proceeding to step 1103, transmits to the AMS an AAI_HO_CMD message for instructing a handover to the target BS that supports only the L zone.

In step 1105, the mixed BS receives a DSA-REQ message for requesting MBS connection information from the AMS. In step 1107, the mixed BS searches for a corresponding MBS provided by the target BS through a backbone network. In this case, the mixed BS determines whether a service corresponding to an MSTID+MFID included in the DSA-REQ message is provided in the L zone of the target BS and searches for zone switching information for switching to the L zone.

In step 1109, the mixed BS determines whether the MBS desired by the AMS is provided in the L zone of the target BS according to the search result. If it is determined in step 1109 that the MBS desired by the AMS is not provided in the L zone of the target BS, proceeding to step 1119, the mixed BS transmits to the AMS a DSA-RSP message by including a code indicating that the MBS desired by the AMS is not provided, and then the procedure of FIG. 11 ends. For example, the mixed BS sets a confirmation code field of the DSA-RSP message to 0x00 and then transmits the message to the AMS.

Otherwise, if it is determined in step 1109 that the MBS desired by the AMS is provided in the L zone of the target BS, proceeding to step 1111, the mixed BS transmits to the AMS the DSA-RSP message by including a code indicating that the MBS desired by the AMS is provided. For example, the mixed BS sets the confirmation code field of the DSA-RSP message to 0x01 and transmits the message to the AMS. In this case, the DSA-RSP message includes information required for zone switching, and as described in Table 2 above, includes an MCID corresponding to the MBS provided in the L zone and its related information such as QoS, an FA index, a PHY preamble, etc.

In step 1113, the mixed BS receives an RNG-REQ message from the AMS through the L zone supported by the mixed BS. In step 1115, the mixed BS determines if changes are made by re-searching for the MBS related information of the target BS. In step 1117, the mixed BS transmits an RNG-RSP indicating the changes to the AMS. Thereafter, the procedure of FIG. 11 ends.

Figure 12:
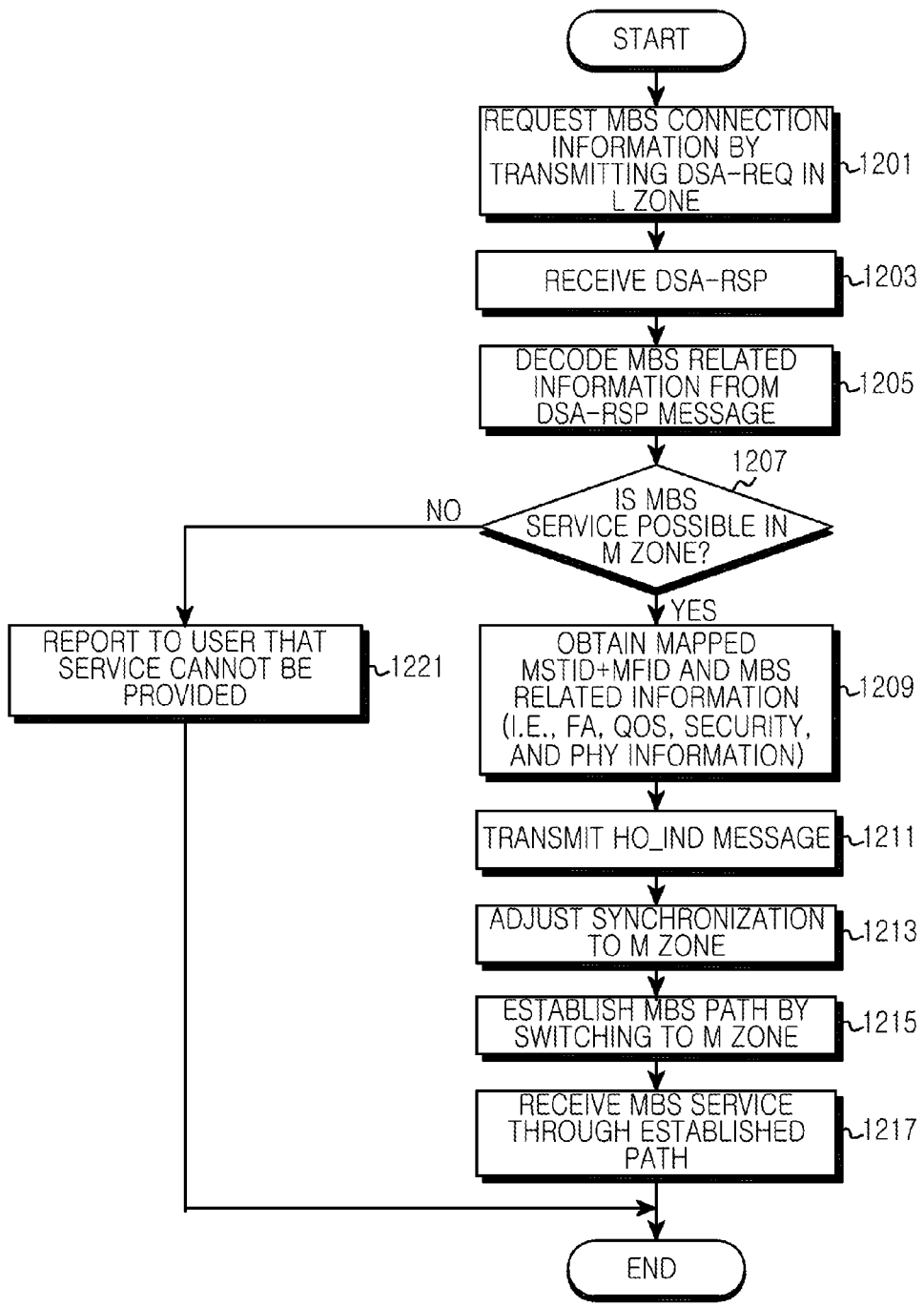
FIG. 12 illustrates a process of operating an AMS in a wireless communication system according to an exemplary embodiment of the present invention.

FIG. 12 illustrates a process of operating an AMS in a wireless communication system according to an exemplary embodiment of the present invention. It is assumed herein that a serving ABS of the AMS is a mixed BS, the mixed BS supports multiple carriers in an M zone, and an MBS is supported through one carrier among the multiple carriers. The AMS performs zone switching to the M zone to receive a new MBS in the L zone of the mixed BS.

Referring to FIG. 12, in step 1201, the AMS requests an MBS connection by transmitting a DSA-REQ message to the mixed BS in order to receive the MBS while performing data communication through the L zone of the mixed BS. In this case, the DSA-REQ message includes an MSTID which corresponds to the MBS in the L zone and QoS (e.g., a service flow parameter), a PHY parameter, and CMAC Tuple which are related to the MBS.

In step 1203, the AMS receives a DSA-RSP message including MBS related information in the M zone from the mixed BS. In step 1205, the AMS decodes the MBS related information included in the DSA-RSP message. In this case, the DSA-RSP message includes information indicating whether the MBS is provided in the M zone, an MSTID+MFID which corresponds to the MBS in the M zone, and QoS (e.g., a service flow parameter), a PHY preamble, and CMAC Tuple which are related to the MBS.

In step 1207, the AMS determines whether the MBS is provided in the M zone by using the decoding result. This may be determined by using a confirmation code field in the DSA-RSP message. For example, if the confirmation code field is 0x00, the AMS may determine that the MBS is not provided in the M zone, and otherwise if the confirmation code field is 0x01, the AMS may determine that the MBS is provided in the M zone.

If it is determined in step 1207 that the MBS is not provided in the M zone, proceeding to step 1221, the AMS reports to a user that a corresponding service cannot be provided, and the procedure of FIG. 12 ends. Otherwise, if it is determined in step 1207 that the MBS is provided in the M zone, proceeding to step 1209, the AMS obtains information included in the DSA-RSP message, i.e., the MSTID+MFID and the MBS related information (i.e., QoS, an FA index, PHY information (i.e., a PHY preamble), and security information (i.e., CMAC Tuple)).

In step 1211, the AMS transmits an HO_IND message to the mixed BS. In this case, the HO_IND message reports that a handover will be performed to an FA included in the DSA-RSP message.

In step 1213, the AMS adjusts synchronization to the M zone on the basis of zone switching information included in the DSA-RSP message. In step 1215, the AMS establishes a connection path by performing zone switching to an FA for providing an MBS in the M zone. In step 1217, the AMS receives MBS data by using the pre-obtained MBS related information through the previous established connection path. Herein, the AMS may perform zone switching by adjusting synchronization to the M zone by using the PHY information, and thereafter may establish the connection path by performing network re-entry on the basis of the MSTID+MFID and the FA index.

Figure 13:
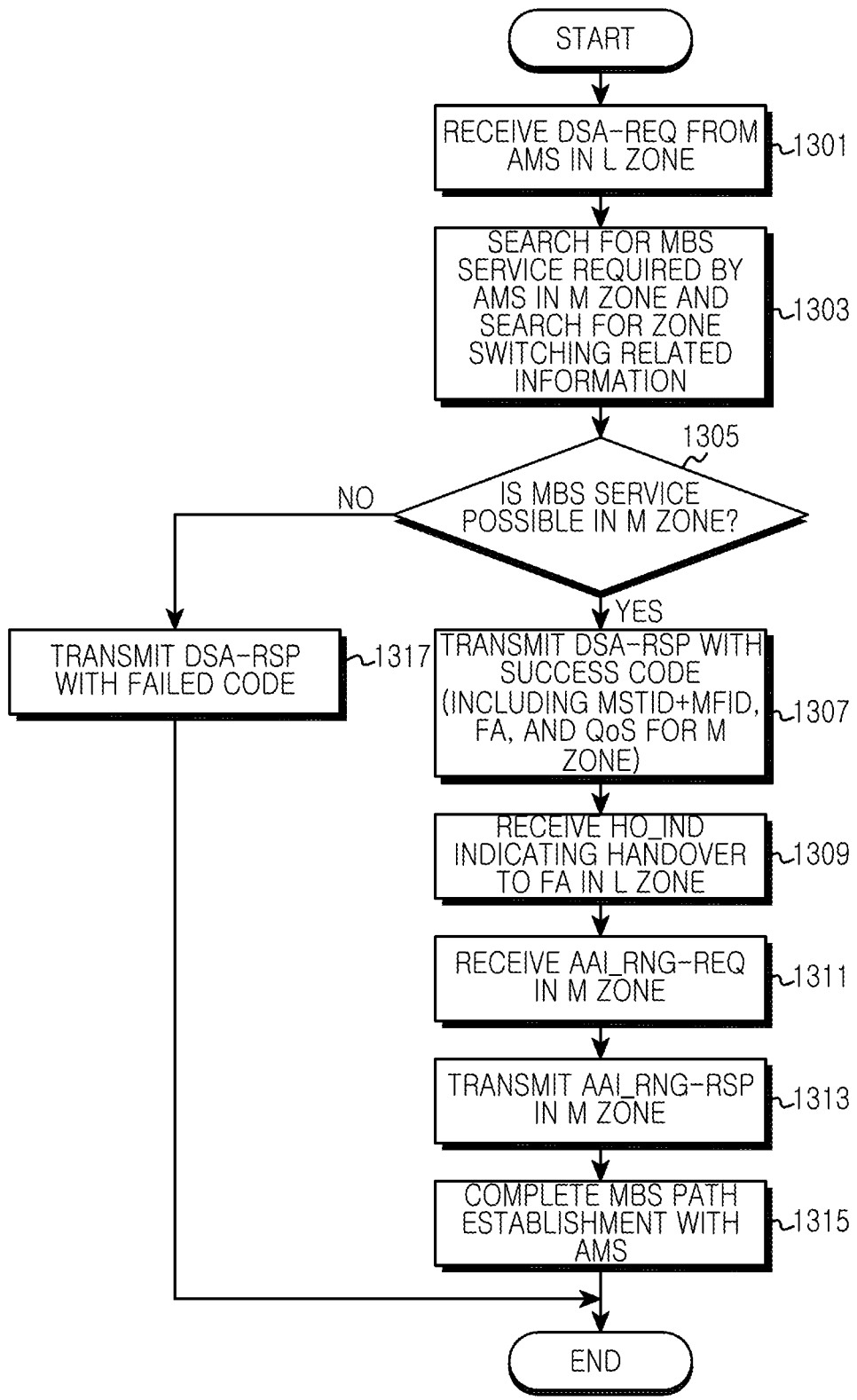
FIG. 13 illustrates a process of operating an ABS in a wireless communication system according to an exemplary embodiment of the present invention.

FIG. 13 illustrates a process of operating an ABS in a wireless communication system according to an exemplary embodiment of the present invention. It is assumed herein that the ABS is a mixed BS that supports both an M zone and an L zone, and provides an MBS in a specific carrier of the M zone. Further, a specific AMS intends to perform zone switching from the L zone to the M zone to receive a new MBS.

Referring to FIG. 13, in step 1301, the mixed BS receives a DSA-REQ message from an AMS which is currently performing data communication through the L zone. In this case, the mixed BS may decode the DSA-REQ message transmitted by the AMS to recognize that the AMS intends to receive the MBS.

In step 1303, the mixed BS determines whether a service desired by the AMS in the M zone that provides the MBS service is provided in the M zone, that is, whether a service corresponding to an MCID included in the DSA-REQ message is provided in the M zone, and searches for zone switching information for switching to the M zone.

In step 1305, the mixed BS determines whether the MBS desired by the AMS is provided in the M zone according to the search result. If it is determined in step 1305 that the MBS desired by the AMS is not provided in the M zone, proceeding to step 1317, the mixed BS transmits to the AMS a DSA-RSP message by including a code indicating that the MBS desired by the AMS is not provided, and then the procedure of FIG. 13 ends. For example, the mixed BS sets a confirmation code field of the DSA-RSP message to 0x00 and then transmits the message to the AMS.

Otherwise, if it is determined in step 1305 that the MBS desired by the AMS is provided in the M zone, proceeding to step 1307, the mixed BS transmits to the AMS the DSA-RSP message by including a code indicating that the MBS desired by the AMS is provided. For example, the mixed BS sets the confirmation code field of the DSA-RSP message to 0x01 and transmits the message to the AMS. In this case, the DSA-RSP message includes information required for zone switching, and includes an MCID corresponding to the MBS provided in the M zone and its related information such as QoS, an FA index, a PHY preamble, etc.

In step 1309, the mixed BS receives an HO_IND message indicating a handover to a specific carrier of the M zone from the AMS through the L zone. The mixed BS receives an RNG-REQ message in the M zone in step 1311, and in response thereto, transmits RNG-RSP to the AMS in step 1313. In step 1315, the mixed BS completely establishes an MBS connection path to the AMS, and the procedure of FIG. 13 ends.

Figure 14:
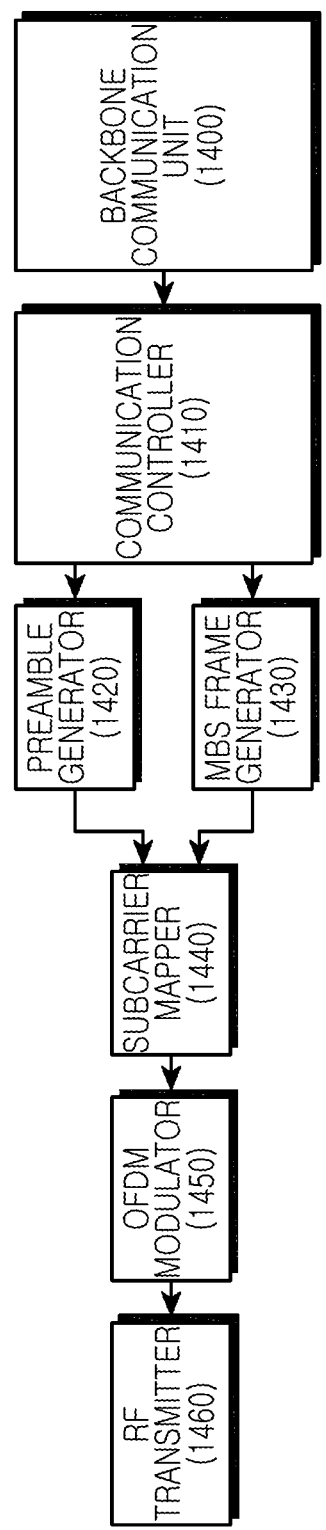
FIG. 14 is a block diagram illustrating a structure of an ABS in a wireless communication system according to an exemplary embodiment of the present invention.

FIG. 14 is a block diagram illustrating a structure of an ABS in a wireless communication system according to an exemplary embodiment of the present invention.

Referring to FIG. 14, the ABS includes a backbone communication unit 1400, a communication controller 1410, a preamble generator 1420, an MBS frame generator 1430, a subcarrier mapper 1440, an OFDM modulator 1450, and a Radio Frequency (RF) transmitter 1460.

The backbone communication unit 1400 provides an interface for performing communication with a super-ordinate node or another ABS through a backbone network when performing a handover. The communication controller 1410 controls an overall function for performing communication including system changes in the ABS, i.e., zone switching or the like. For example, the backbone communication unit 1400 obtains MBS related information in neighboring ABSs or another system and provides advertisement information under the control of the communication controller 1410. If a format of a backbone network message between ABSs of a new system is different from a format of a backbone network message between ABSs of a legacy system, the backbone communication unit 1400 provides the advertisement information by using the backbone network message of the legacy system under the control of the communication controller 1410. On the other hand, in case of a mixed BS, the communication controller 1410 performs an individual operation according to a system in use. In addition, the communication controller 1410 decodes a message to instruct a corresponding operation (e.g., system changes) or the like. More particularly, the communication controller 1410 controls and processes a function for searching for MBS related information for a zone to be switched so as to provide the information through a DSA message before the AMS performs zone switching. Further, when a preamble transmission time arrives, the communication controller 1410 triggers an operation of the preamble generator 1420.

The preamble generator 1420 generates a preamble signal corresponding to a preamble index allocated to the ABS according to a system configuration. That is, the preamble generator 1420 generates a physical complex-valued symbol stream according to a sequence corresponding to the preamble index, and provides the preamble signal to the subcarrier mapper 1440 according to a transmission period of a preamble signal.

The MBS frame generator 1430 configures an MBS frame using a mechanism assigned to the ABS according to the system configuration. An additional MAP may be included in the MBS frame. The MBS frame generator 1430 is independently configured for each system, and provides an MBS frame signal to the subcarrier mapper 1440 according to a frame transmission period.

The subcarrier mapper 1440 maps the preamble signal and complex-valued symbols that constitute the MBS frame to a frequency domain according to a predefined rule. The OFDM modulator 1450 converts the complex-valued symbols mapped to the frequency domain by using an Inverse Fast Fourier Transform (IFFT) operation, and configures an OFDM symbol by inserting a Cyclic Prefix (CP). The RF transmitter 1460 up-converts the OFDM symbol to an RF signal, and transmits the RF signal through an antenna.

Figure 15:
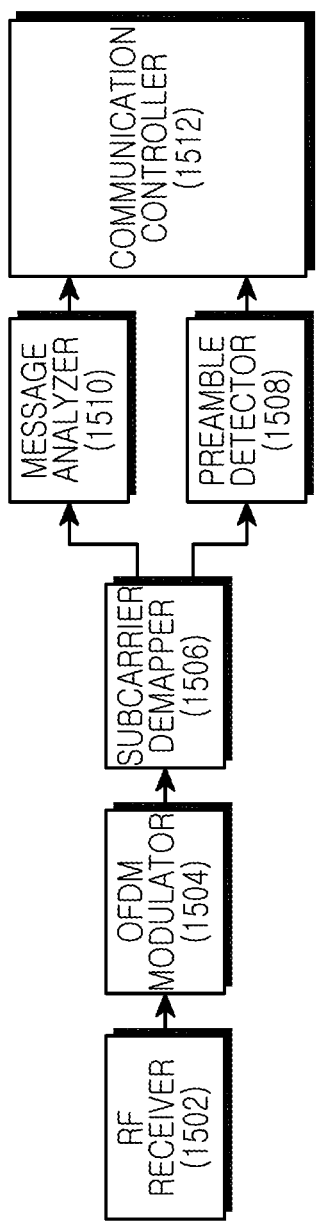
FIG. 15 is a block diagram illustrating a structure of an AMS in a wireless communication system according to an exemplary embodiment of the present invention.

FIG. 15 is a block diagram illustrating a structure of an AMS in a wireless communication system according to an exemplary embodiment of the present invention.

Referring to FIG. 15, the AMS includes an RF receiver 1502, an OFDM modulator 1504, a subcarrier demapper 1506, a preamble detector 1508, a message analyzer 1510, and a communication controller 1512.

The RF receiver 1502 down-converts an RF signal received through an antenna to a baseband signal. The OFDM modulator 1504 divides the baseband signal in an OFDM symbol unit, removes a CP, and then restores complex-valued symbols mapped to a frequency domain by using a Fast Fourier Transform (FFT) operation. The subcarrier demapper 1506 divides the complex-valued symbols mapped to the frequency domain in a processing unit. For example, the subcarrier demapper 1506 extracts a preamble signal and a pilot signal, each of which is used in channel quality estimation, extracts a signal of a control message, and provides the extracted signals to the message analyzer 1510.

The message analyzer 1510 analyzes a control message received from an ABS. That is, the message analyzer 1510 evaluates a type of the received control message and information included in the control message. For example, the message analyzer 1510 evaluates information for system changes or a handover from the serving ABS. The information includes a DSA message proposed in the present invention, and also includes a BSID, a MCID, an FA index, a preamble index, etc. Further, the message analyzer 1510 analyzes an MBS service frame. The message analyzer 1510 exists independently for each system.

The preamble detector 1508 scans preamble signals corresponding to preamble indices provided from the communication controller 1512. In this case, the preamble indices provided from the communication controller 1512 include a preamble index of a new system and a preamble index of a legacy system. That is, the preamble detector 1508 attempts to detect a preamble signal of the new system corresponding to the preamble index of the new system, and attempts to detect a preamble signal of the legacy system corresponding to the preamble index of the legacy system. Thereafter, the preamble detector 1508 reports preamble information to the communication controller 1512.

The communication controller 1512 controls an overall function for performing communication of the AMS. For example, the communication controller 1512 determines whether to perform system changes or a handover to a neighboring ABS by considering a location of an MBS service and an overall system condition. More particularly, the communication controller 1512 controls and processes a function for obtaining MBS related information of a zone to be switched before zone switching When performing system changes (or zone switching), the communication controller 1512 performs a physical control function required to change the legacy system to the new system on the basis of information obtained from the DSA message proposed in the present invention. More specifically, the communication controller 1512 extracts information such as a preamble, an FA, an MCID, etc., of the DSA message received from the serving ABS, configures preamble indices of the new system by using the preamble indices, and performs a control function for accessing to the FA.

Although it has been described above that the AMS performs zone switching to a specific carrier that supports an E-MBS or an MBS (hereinafter, referred to as E-MBS) when the ABS support multiple carriers, the AMS may move to a carrier that provides the E-MBS irrespective of a zone when the ABS supports multiple carriers and thus the E-MBS is provided in a specific carrier.

That is, the AMS may perform carrier switching to receive the E-MBS in a specific zone that supports multiple carriers. For example, it is assumed that an E-MBS service is provided by using a secondary carrier in a system that supports a primary carrier and the secondary carrier in the specific zone. In this case, the secondary carrier may be a carrier dedicated for the E-MBS service.

Figure 16:
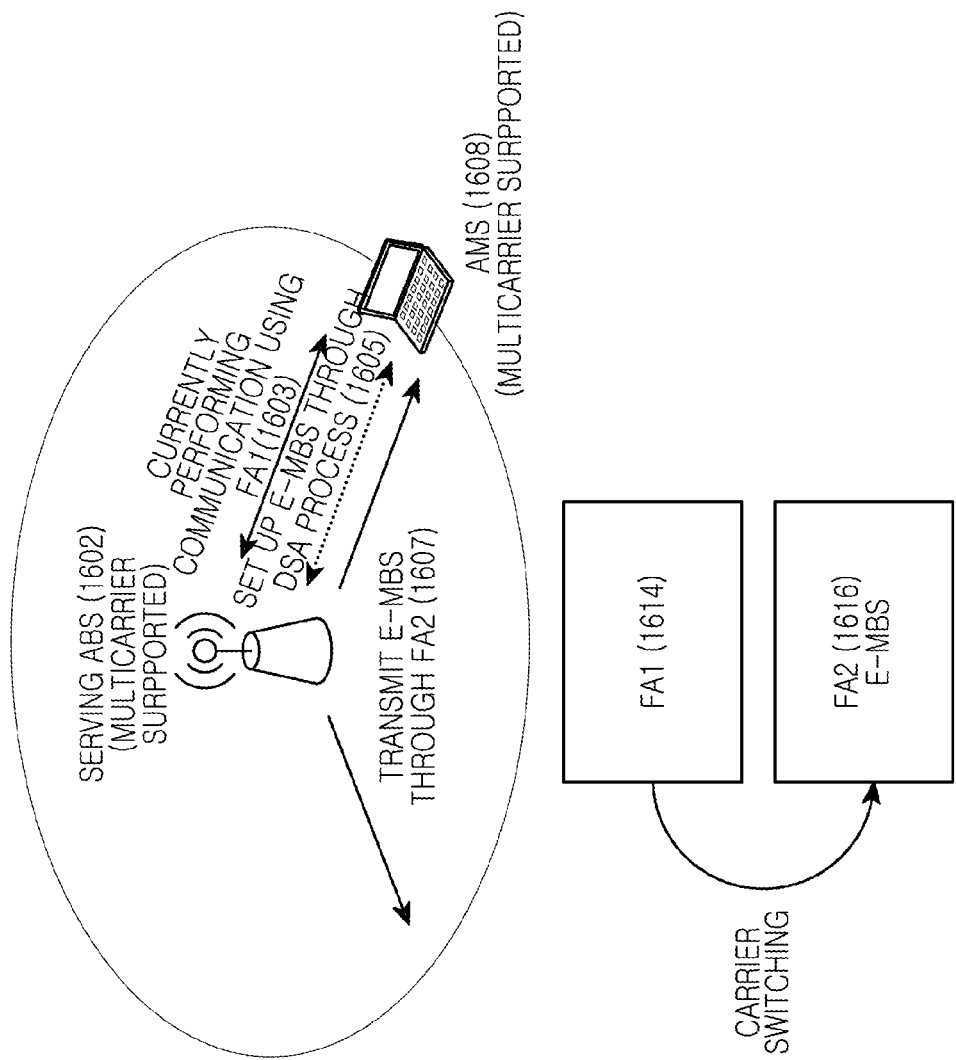
FIG. 16 illustrates a structure of a wireless communication system according to an exemplary embodiment of the present invention.

FIG. 16 illustrates a structure of a wireless communication system according to an exemplary embodiment of the present invention.

Referring to FIG. 16, an AMS 1608 is in a state where data is transmitted and received using an FA1 1614 as a primary carrier, in step 1603. In this case, a serving ABS 1602 periodically broadcasts an AAI_E-MBS-CFG message including E-MBS service configuration information. The E-MBS service configuration information includes location information of an E-MBS MAP and an E-MBS zone ID. Further, the serving ABS 1602 and the AMS 1608 exchange AAI_REG_REQ/AAI_REG_RSP messages or E-MBS capability exchange while performing a network entry process.

Thereafter, the AMS 1608 exchanges a DSA-REQ/DSA-RSP message with the serving ABS 1602 for E-MBS flow establishment in step 1605. That is, the AMS 1608 transmits the DSA-REQ message to the serving ABS 1602 to connect an E-MBS service, and the serving ABS 1602 transmits the DSA-RSP message to the AMS 1608 to respond to whether the E-MBS service may be connected, or the serving ABS 1602 transmits the DSA-REQ message to the AMS 1608 to connect the E-MBS service and the AMS 1608 transmits the DSA-RSP message to the serving ABS 1602 to respond to whether the E-MBS service may be connected. In this case, the DSA-REQ or DSA-RSP message transmitted by the ABS 1602 to the AMS 1608 includes an E-MBS service, an E-MBS zone ID, an E-MBS service flow parameter, a physical carrier index, a carrier switching mode, and a unicast available interval bitmap. The E-MBS service indicates whether the E-MBS service is requested or provided to instruct current connection setup. The E-MBS zone ID indicates an E-MBS zone having a valid connection related to a current service flow. The E-MBS service flow parameter indicates E-MBS ID and FID mapping. The physical carrier index indicates a target carrier to be switched by the AMS. In addition, the carrier switching mode indicates a carrier switching mode on the basis of a unicast available interval and an available interval report. The unicast available interval indicates a bitmap that indicates a time required when the AMS returns to the primary carrier 1614. The AMS 1608 and the ABS 1602 may exchange E-MBS related information by exchanging DSC_REQ/DSC_RSP messages or DSD_REQ/DSD_RSP exchanges.

The AMS 1608 establishes a connection path for E-MBS reception on the basis of the exchanged E-MBS related information, determines that a carrier that provides the E-MBS is a secondary carrier 1616 from the physical carrier index, performs carrier switching to the secondary carrier 1616 by using the AAI-E-MBS-REP message, and then receives an E-MBS transmitted by the ABS 1602 through the secondary carrier 1616, in step 1607.

Figure 17:
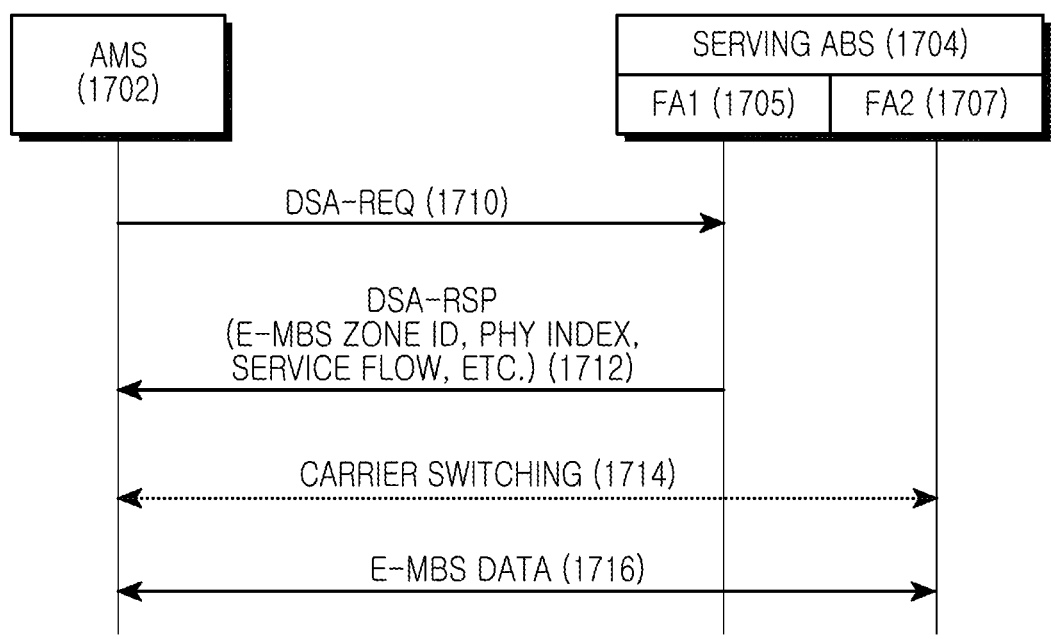
FIG. 17 illustrates a carrier switching scenario for receiving MBS data in a wireless communication system according to an exemplary embodiment of the present invention.

FIG. 17 illustrates a carrier switching scenario for receiving MBS data in a wireless communication system according to an exemplary embodiment of the present invention.

Referring to FIG. 17, it is assumed that an AMS 1702 performs a network entry process by using an FA1 1705 as a primary carrier and is in a state where data communication is being performed with a serving ABS 1704 or data communication may be performed. The serving ABS 1704 periodically broadcasts an AAI_E-MBS-CFG message including E-MBS service configuration information. The serving ABS 1704 and the AMS 1702 exchange AAI_REG_REQ/AAI_REG_RSP messages for E-MBS capability exchange while performing a network entry process.

When the AMS 1702 transmits a DSA-REQ message for E-MBS service connection to the serving ABS 1704 through the FA1 1705 in step 1710, the serving ABS 1704 transmits a DSA-RSP message including E-MBS related information to the AMS 1702 in step 1712. The DSA-RSP message includes an E-MBS service, an E-MBS zone ID, an E-MBS service flow parameter, a physical carrier index, a carrier switching mode, and a unicast available interval bitmap. When the ABS 1704 generates the DSA-REQ message for the E-MBS service connection and transmits the message to the AMS 1702, the E-MBS related information will be included in the DSA-REQ message.

The AMS 1702 establishes a connection path for the E-MBS reception on the basis of the E-MBS related information included in the DSA-RSP message, and determines that a carrier for providing an E-MBS is an FA2 1707, i.e., a secondary carrier, from the physical carrier index. In step 1714, the AMS 1702 performs carrier switching to the secondary carrier 1707. In step 1716, the AMS 1702 receives E-MBS data through the secondary carrier 1707.

According to exemplary embodiments of the present invention, switching information and MBS data reception information are obtained by transmitting and receiving DSA-REQ/DSA-RSP messages and thereafter switching is performed to a location for providing an MBS and an MBS data reception path is established in a broadband wireless communication system using multiple carriers. Therefore, there is an advantage in that a delay time of MBS data reception caused by switching may be reduced.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of an Advanced Base Station (ABS) for a Multicast Broadcast Service (MBS) in a broadband wireless communication system, the method comprising:

transmitting to an Advanced Mobile Station (AMS) a Dynamic Service Addition (DSA) message including at least one relevant MBS parameter; and transmitting MBS data through a MBS zone indicated by the relevant MBS parameter, wherein the at least one the relevant MBS parameter indicates to the AMS whether to listen to MBS on a MBS zone of an advanced system or to listen to MBS on a MBS zone of a legacy system, and wherein the DSA message includes a physical carrier index which indicates the target carrier to be switched by the AMS.

2. The method of claim 1, wherein the DSA message further includes at least two parameters selected from among a MBS service, a MBS zone ID and a MBS service flow parameter.

3. The method of claim 1, wherein the MBS service indicates whether the MBS service is requested or provided to instruct a current connection setup, wherein the MBS Zone ID indicates a MBS zone having a valid connection related to the current service flow, and wherein the MBS service flow parameter comprises a mapping of multicast Station Identifier (STID) and Flow Identifier (FID).

4. A method of an Advanced Mobile Station (AMS) for a Multicast Broadcast Service (MBS) in a broadband wireless communication system, the method comprising:

receiving a Dynamic Service Addition (USA) message including at least one relevant MBS parameter; and receiving MBS data through a MBS zone indicated by the relevant MBS parameter, wherein the at least one the relevant MBS parameter indicates to the AMS whether to listen to MBS on a MBS zone of an advanced system or to listen to MBS on a MBS zone of a legacy system, wherein the USA message includes a physical carrier index which indicates the target carrier to be switched by the AMS.

5. The method of claim 4, wherein the USA message further includes at least two parameters selected from among a MBS service, a MBS zone ID and a MBS service flow parameter.

6. The method of claim 5, wherein the MBS service indicates whether the MBS service is requested or provided to instruct a current connection setup, wherein the MBS Zone ID indicates a MBS zone having a valid connection related to the current service flow, and wherein the MBS service flow parameter comprises a mapping of multicast Station Identifier (STD) and Flow Identifier (FID).

7. An apparatus of an Advanced Base Station (ABS) for a Multicast Broadcast Service (MBS) in a broadband wireless communication system, the apparatus comprising:

a communication unit for processing a signal transmitted to and received from an Advanced Mobile Station (AMS); and a controller for transmitting to the AMS a Dynamic Service Addition (DSA) message including at least one relevant MBS parameter, and for transmitting MBS data through a MBS zone indicated by the relevant MBS parameter, wherein the at least one the relevant MBS parameter indicates to the AMS whether to listen to MBS on a MBS zone of an advanced system or to listen to MBS on a MBS zone of a legacy system, and wherein the DSA message includes a physical carrier index which indicates the target carrier to be switched by the AMS.

8. The apparatus of claim 7, wherein the DSA message further includes at least two parameters selected from among a MBS service and a MBS zone ID, a MBS service flow parameter.

9. The apparatus of claim 7, wherein the MBS service indicates whether the MBS service is requested or provided to instruct current connection setup, wherein the MBS Zone ID indicates a MBS zone having a valid connection. related to the current service flow, wherein the MBS service flow parameter comprises a mapping of multicast Station Identifier (STID) and Flow Identifier (FID), and wherein the physical carrier index indicates a target carrier to be switched by the AMS.

10. An apparatus of an Advanced Mobile Station (AMS) a Multicast Broadcast Service (MBS) in a broadband wireless communication system, the apparatus comprising:

a communication unit for processing a signal transmitted to and received from an Advanced Base Station (ABS); and a controller for receiving a Dynamic Service Addition (DSA) message including at least on relevant MBS parameter, and tier receiving MBS data through a MBS zone indicated by the relevant MBS parameter, wherein the at least one the relevant MBS parameter indicates to the AMS whether to listen to MBS on a MBS zone of an advanced system or to listen to MBS on a MBS zone of a legacy system, and wherein the DSA message includes a physical carrier index which indicates the target carrier to be switched by the AMS.

11. The apparatus of claim 10, wherein the DSA message further includes at least two parameters selected from among a MBS service, a MBS zone ID and a MBS service flow parameter.

12. The apparatus of claim 10, wherein the MBS service indicates whether the MBS service is requested or provided to instruct current connection setup, wherein the MBS Zone ID indicates a MBS zone having a valid connection. related to the current service flow, and wherein the MBS service flow parameter comprises a mapping of multicast Station Identifier (STID) and Flow Identifier (FID).

* * * * *